(12) United States Patent
Mark et al.

(10) Patent No.: US 12,204,031 B2
(45) Date of Patent: Jan. 21, 2025

(54) LASER SCANNER

(71) Applicant: LEICA GEOSYSTEMS AG, Heerbrugg (CH)

(72) Inventors: Simon Mark, Thal (CH); Klaus Bereuter, Alberschwende (AT); Benjamin Müller, St. Gallen (CH); Roman Steffen, Rebstein (CH); Burkhard Böckem, Jonen (CH); Jürgen Dold, Sempach (CH); Jochen Scheja, Hohenems (AT); Lukas Heinzle, Wädenswil (CH); Charles Leopold Elisabeth Dumoulin, Balgach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 18/201,672

(22) Filed: May 24, 2023

(65) Prior Publication Data
US 2023/0314616 A1    Oct. 5, 2023

Related U.S. Application Data

(63) Continuation of application No. 16/348,842, filed as application No. PCT/EP2016/077372 on Nov. 10, 2016, now Pat. No. 11,703,597.

(51) Int. Cl.
*G01S 17/89* (2020.01)
*G01B 11/00* (2006.01)
(Continued)

(52) U.S. Cl.
CPC ............ *G01S 17/89* (2013.01); *G01S 7/4813* (2013.01); *G01S 7/4817* (2013.01);
(Continued)

(58) Field of Classification Search
None
See application file for complete search history.

(56) References Cited

U.S. PATENT DOCUMENTS

| 6,366,345 B1 | 4/2002 | Yamabuchi |
| 7,359,047 B2 | 4/2008 | Lippuner |

(Continued)

FOREIGN PATENT DOCUMENTS

| AT | 509-180 B1 | 1/2016 |
| CN | 104052986 A | 9/2014 |

(Continued)

OTHER PUBLICATIONS

European Search Report dated May 19, 2022 as received in application No. 16794345.
(Continued)

*Primary Examiner* — Reza Aghevli
(74) *Attorney, Agent, or Firm* — Maschoff Brennan

(57) ABSTRACT

A laser scanner and a system with a laser scanner for measuring an environment. The laser scanner includes an optical distance measuring device, a support, a beam steering unit rotatably fixed to the support which rotates around a beam axis of rotation. The beam steering unit includes a mirrored surface which deflects radiation used in the optical distance measurement and an angle encoder for recording angle data. The optical distance measurement is performed by a progressive rotation of the beam steering unit about the beam axis of rotation and the continuous emission of a distance measurement radiation, the emission being made through an outlet area arranged in the direction of the mirrored surface on the support, the receiving optics for receiving radiation are arranged on the support, and wherein the outlet area has a lateral offset with respect to the optical axis of the receiving optics.

15 Claims, 22 Drawing Sheets

(51) Int. Cl.
*G01B 11/02* (2006.01)
*G01B 11/22* (2006.01)
*G01S 7/48* (2006.01)
*G01S 7/481* (2006.01)
*G01S 7/497* (2006.01)
*G01S 17/42* (2006.01)
*G01S 17/894* (2020.01)
*G06T 11/00* (2006.01)

(52) U.S. Cl.
CPC .......... *G01S 7/4972* (2013.01); *G01S 17/42* (2013.01); *G01B 11/00* (2013.01); *G01B 11/002* (2013.01); *G01B 11/024* (2013.01); *G01B 11/22* (2013.01); *G01S 7/4808* (2013.01); *G01S 7/4811* (2013.01); *G01S 7/4814* (2013.01); *G01S 17/894* (2020.01); *G06T 11/00* (2013.01); *G06T 2207/10028* (2013.01)

(56) References Cited

U.S. PATENT DOCUMENTS

| | | | |
|---|---|---|---|
| 8,269,984 B2 | 9/2012 | Hinderling et al. | |
| 8,395,759 B2 | 3/2013 | Wolf et al. | |
| 9,057,610 B2 | 6/2015 | Graesser et al. | |
| 9,341,474 B2 | 5/2016 | Plangger et al. | |
| 9,891,320 B2* | 2/2018 | Boeckem | G01S 17/86 |
| 10,008,141 B2 | 6/2018 | Lapstun | |
| 10,060,769 B2 | 8/2018 | Bereuter et al. | |
| 10,408,251 B2 | 9/2019 | Pillay | |
| 10,412,368 B2 | 9/2019 | Osterwood et al. | |
| 10,458,455 B2 | 10/2019 | Pillay | |
| 10,458,456 B2 | 10/2019 | Pillay | |
| 10,495,756 B2 | 12/2019 | Walsh et al. | |
| 11,703,597 B2 | 7/2023 | Mark et al. | |
| 11,726,184 B2 | 8/2023 | Ferreira et al. | |
| 2013/0120738 A1 | 5/2013 | Bonin et al. | |
| 2014/0063489 A1 | 3/2014 | Steffey | |
| 2014/0327901 A1 | 11/2014 | Gros et al. | |
| 2015/0042568 A1 | 2/2015 | Krah | |
| 2015/0096181 A1* | 4/2015 | Plangger | G02B 26/105 33/290 |
| 2015/0323355 A1 | 11/2015 | Kramer et al. | |
| 2015/0331108 A1 | 11/2015 | Itami et al. | |
| 2015/0362588 A1 | 12/2015 | Ohmuro | |
| 2016/0033258 A1 | 2/2016 | Böckem et al. | |
| 2016/0131745 A1* | 5/2016 | Nordenfelt | G01S 17/08 356/4.01 |
| 2016/0181888 A1 | 6/2016 | Kodani et al. | |
| 2016/0274224 A1* | 9/2016 | Nordenfelt | G01C 15/002 |
| 2017/0356158 A1* | 12/2017 | Ohtomo | E02F 9/262 |
| 2017/0363448 A1* | 12/2017 | Dunn | H01S 3/0014 |
| 2018/0031596 A1* | 2/2018 | Bell | G01P 3/36 |
| 2018/0038690 A1* | 2/2018 | Ohtomo | H02K 7/085 |
| 2018/0052233 A1* | 2/2018 | Frank | G01S 17/89 |
| 2018/0099744 A1* | 4/2018 | B?Ckem | G01S 17/89 |
| 2018/0101961 A1* | 4/2018 | Zweigle | G01S 7/4808 |
| 2018/0238687 A1* | 8/2018 | Gächter Toya | G01S 7/4817 |
| 2019/0011257 A1* | 1/2019 | Schwendener | G01S 17/42 |
| 2019/0064328 A1* | 2/2019 | Ammer | G01S 17/86 |
| 2019/0064361 A1* | 2/2019 | Kotake | G01S 17/42 |
| 2019/0154443 A1* | 5/2019 | Winter | G01S 7/4813 |
| 2020/0004166 A1* | 1/2020 | Aoki | G03F 7/70758 |
| 2020/0284883 A1 | 9/2020 | Ferreira et al. | |
| 2024/0094353 A1 | 3/2024 | Ferreira et al. | |

FOREIGN PATENT DOCUMENTS

| | | | | |
|---|---|---|---|---|
| CN | 104238256 | A | 12/2014 | |
| CN | 104243977 | A | 12/2014 | |
| DE | 101-05-774 | A1 | 8/2001 | |
| DE | 103-41-548 | A1 | 3/2005 | |
| DE | 100 42 327 | B4 | 10/2005 | |
| DE | 10 2012 105 027 | A1 | 1/2013 | |
| DE | 20 2013 001 538 | U1 | 3/2013 | |
| DE | 10 2013 102 554 | A1 | 9/2014 | |
| DE | 102015105263 | A1 * | 10/2016 | G01S 17/42 |
| EP | 1 160 499 | A1 | 12/2001 | |
| EP | 2 506 035 | A2 | 10/2012 | |
| EP | 2 728 309 | A2 | 5/2014 | |
| EP | 2 980 526 | A1 | 2/2016 | |
| EP | 2 998 778 | A2 | 3/2016 | |
| EP | 2998700 | A1 | 3/2016 | |
| EP | 3 056 923 | A1 | 8/2016 | |
| EP | 3 078 984 | A1 | 10/2016 | |
| EP | 3 501 792 | A1 | 6/2019 | |
| EP | 3 915 881 | A1 | 12/2021 | |
| EP | 3 915 882 | A1 | 12/2021 | |

OTHER PUBLICATIONS

Trimble Navigation Limited "Trimble TX5 3D Laser Scanner" Oct. 1, 2012.
User Guide, "Trimble TX5 3D Laser Scanner," Version 2.00, Revision A, Mar. 2013, pp. 1-126; https://surveyinghill.com/downloads/Trimble%20TX5%203D%20Laser%20Scanner%20User%20Guide.pdf (2013).
Extended European Search Report dated Mar. 5, 2024 as received in Application No. 23212141.8.
Extended European Search Report dated Mar. 5, 2024 as received in Application No. 23212142.6.
Extended European Search Report dated Mar. 7, 2024 as received in Application No. 23212143.4.
Extended European Search Report dated Mar. 7, 2024 as received in Application No. 23212136.8.
Extended European Search Report dated Mar. 7, 2024 as received in Application No. 23212138.4.
Extended European Search Report dated Mar. 7, 2024 as received in Application No. 23212139.2.
Extended European Search Report dated Mar. 7, 2024 as received in Application No. 23212140.0.

* cited by examiner

LASER SCANNER

CROSS-REFERENCE TO RELATED APPLICATIONS

This application claims priority to PCT Application PCT/EP2016/077372, filed on Nov. 10, 2016. The foregoing patent application are incorporated herein by reference.

FIELD OF INVENTION

The invention relates to a laser scanner for optical measurement and for imaging an environment, in particular for generating and displaying a colored 3D point cloud.

BACKGROUND

A three-dimensional measurement of rooms and environments is of great interest to craftsmen and architects, for example, since this allows an actual condition and/or the construction progress of rooms or a construction site to be rapidly captured so that pending work can be scheduled. By means of a visual display in the form of a point cloud, for example in combination with multiple temporal levels using an augmented reality and/or in the form of a virtual reality, different options for further steps or extension possibilities can then be reviewed and, if necessary, presented to a colleague or customer in a simple manner.

An environment can be optically scanned and measured using a laser scanner. A common approach to this involves a scanning of the environment by means of pulsed electromagnetic radiation, e.g. laser light, wherein an echo is received from a back-scattering surface point of the environment and, for example, on the basis of the transit time, the shape, and/or the phase of the pulse a distance to the surface point is derived and in each case associated with the spatial position of the surface point, for example using angle information at the time of the measurement and using the known location of the laser scanner.

Significant differences in the design of a laser scanner are obtained, in particular due to whether the laser scanner is intended for an optical scanning process in the form of a raster scanning or in the form of a scanning sensing, wherein the present invention relates mainly to scanning laser scanners, specifically to laser scanners with a beam deflection unit rotating at high speed.

In the case of a raster scanning the optical sensing takes place, for example, by means of a specific individual sensing of a plurality of surface points, for example on the basis of a predefined scanning raster for the environment to be scanned, in other words by using specific targeting of individual predefined raster points.

In the case of a scanned sensing typically by means of at least one rotating beam deflection element for variation of the alignment of the emission direction of the distance measurement beam, e.g. a plane mirror inclined with respect to an axis of rotation, a plurality of measuring points is recorded and spatially measured, wherein, for example, a desired point-to-point resolution is achieved by adjustment of the pulse rate of the distance measurement beam and/or by adjusting the rotational speed of the beam deflection element. The environment can then be analyzed and/or displayed in different ways based on the plurality of measurement points using common data processing steps and/or display methods, in particular as a 3D point cloud.

Typically, scanning laser scanners have one or two mutually orthogonal axes of rotation, for example a vertical axis of rotation for a comparatively slow rotation of the entire laser scanner, often also referred to as "azimuth axis" or "slow axis", and a horizontal axis of rotation perpendicular thereto for a high-speed rotating beam deflection element. Due to the high rotation speeds of the beam deflection element frequently used, the second axis is also referred to as "the fast axis".

For a sensing of linear or linearly moveable structures and environments, such as, for example, railway track systems, roads, tunnels systems or air fields, instead of a rotation around the azimuth axis a translational motion of the entire laser scanner is often utilized, for example, by the laser scanner being mounted on a vehicle. Such laser scanners, which only have the fast axis, are also known as profilers.

Such laser scanners with a fast axis, and possibly with an azimuth axis or in combination with a translational motion, enable a user to sense large surfaces and objects in a relatively small period of time.

For additional information, the information and scanning data can be combined and processed, for example, with camera data, in particular RGB camera data or infrared data.

In some cases, distance measurement modules used in laser scanners for spatial measurement have an intensity sensitivity but no color sensitivity, which means the 3D point cloud generated can be displayed in grayscale levels without the need to use additional data. Using a referencing of the "gray" 3D point cloud with RGB data from a color camera, for example a "colored" 3D point cloud can be generated, which makes, for example, its display considerably easier to the human eye. The referencing of different data and data sets, such as those from temporally and spatially varying measurement procedures, is nowadays increasingly standardized.

Laser scanners can also be designed with a position and orientation system, for example by means of an inertial system, tilt sensors or a receiver for a global satellite navigation system, for example wherein local sensing data are automatically referenced with a global 3D coordinate system.

SUMMARY

An object of some aspects of the invention is to provide an improved laser scanner and an improved system for measuring and for imaging an environment by means of a laser scanner.

This object is achieved by the implementation of the characterizing features of the independent claims. Features that extend the invention in alternative or more advantageous ways are contained in the dependent claims.

Some aspects of the invention relate to a measurement system for optical measurement and for imaging an environment, with a laser scanner for collecting measurement data, a processing unit for processing parts of the measurement data into processed measurement data, and with a display for displaying portions of the processed measurement data which represent at least a partial region of the environment; wherein the laser scanner comprises an optical distance measuring device for detecting distance measurement data, with a transmitter unit for emitting a distance measurement radiation and a receiver unit for receiving returning parts of the distance measurement radiation, a surface sensor for detecting surface sensor data, in particular, at least one color camera for recording image data, wherein the sensor defines an optical axis of the sensor and a viewing direction of the sensor along the optical axis, a base, a support which is fixed to the base such that it can rotate about a support axis of rotation, in particular a slow axis of rotation, a beam steering unit for the distance measurement radiation which is fixed to the support such that it can rotate about a beam axis of rotation, in particular a fast axis of rotation, substantially orthogonal to the support axis of rotation, a first angle encoder for detecting data relating to a first rotation of the support about the support axis of rotation and a second angle encoder for detecting data relating to a rotation of the beam steering unit about the beam axis of rotation, wherein the distance measurement data, the surface sensor data and the first and second angle data, hereafter designated as measurement data, (wherein the distance measurement data in combination with the first and second angle data are often also referred to as sampled measurement data) are detected during a measurement process which comprises a scanning sensing by means of the distance measuring device with a defined progressive, in particular continuous, rotation of the support about the support axis of rotation, with a defined progressive, in particular continuous, rotation of the beam steering unit about the beam axis of rotation, and with a continuous emission of the distance measurement radiation and a continuous reception of returning parts of the distance measurement radiation, and multiple reading of the surface sensor with respect to different viewing directions of the sensor.

One aspect of some embodiments of the invention relate, for example, to the fact that the processing unit is arranged on a separate computing device from the laser scanner, in particular a computer or tablet, and the laser scanner and the computing device are configured in such a way that a transmission of the measurement data from the laser scanner to the computing device takes place, in particular wirelessly, specifically by means of a WLAN or Bluetooth connection, an at least initial processing of the parts of the measurement data in terms of an association of the surface sensor data with the distance measurement data and the first and second angle data takes place during the measurement process, and the display of portions of the processed measurement data takes place during the measurement process and is progressively, in particular continuously, updated based on the processed measurement data, in particular supplemented and/or replaced, specifically wherein a display coupled or integrated with the computing device is provided for the display.

One embodiment relates, for example, to the fact that by means of a virtual 360-degree rotation of the beam steering unit about the beam axis of rotation a scanning plane of the distance measurement radiation is defined, and the surface sensor is arranged and oriented on the support in such a way that its azimuthal viewing direction and the azimuthal orientation of the scanning plane are different, which means that a virtual backwards extension of the optical axis of the surface sensor cuts the scanning plane under a defined cutting angle, in particular wherein the cutting angle is at least 45 degrees, specifically wherein the scanning plane is not captured by the field of view of the surface sensor, wherein a fully automated first pre-programmed measurement process with defined steps is carried out according to the following temporal sequence:
  providing surface sensor data comprising
    rotation of the support about the support axis of rotation,
    reading from the surface sensor for detecting surface sensor data, and
    data streaming of a portion of the detected surface sensor data to the computing device,
  in particular, wherein an initial processing and display of the detected surface sensor data is carried out based on the data streaming,
  providing scanning measurement data, namely distance measurement data and associated first and second angle data, comprising,
    rotation of the support about the support axis of rotation,
    rotation of the beam steering unit about the beam axis of rotation,
    emitting the distance measurement radiation and receiving returning parts of the distance measurement radiation for detecting distance measurement data, wherein associated first and second angle data are detected during the detection of distance measurement data, and
    data streaming of a portion of the detected scanning measurement data to the computing device,
  initial processing of the parts of the surface sensor data and scanning measurement data transmitted by means of data streaming, and
  displaying the parts of the surface sensor data and scanning measurement data associated by means of data streaming in the form of a colored 3D point cloud.

A further embodiment relates to the fact that a second pre-programmed measurement process is carried out with a defined temporal sequence of the following steps:
  providing a first set of surface sensor data, in particular surface sensor data with reduced resolution, comprising
    rotation of the support about the support axis of rotation,
    reading from the surface sensor for detecting surface sensor data, and
    data streaming of a portion of the detected surface sensor data to the computing device,
  in particular, wherein an initial processing and display of the first set of surface sensor data is carried out based on the data streaming,
  deriving a set of exposure times of the surface sensors based on the first set of surface sensor data, and
  providing a second set of surface sensor data based on the set of exposure times of the surface sensors, comprising
    rotation of the support about the support axis of rotation,
    reading from the surface sensor for detecting surface sensor data, and
    data streaming of a portion of the detected surface sensor data to the computing device,
  in particular, wherein based on the data streaming, an initial processing and display of the second set of surface sensor data is carried out.

A further embodiment relates to the fact that a third pre-programmed measurement process is carried out with a defined temporal sequence of the following steps:
  providing surface sensor data comprising
    rotation of the support about the support axis of rotation,
    reading from the surface sensor for detecting surface sensor data, in particular wherein the detection of the surface sensor data comprises a data processing of exclusively read out, namely unprocessed, surface sensor raw data, and
    data streaming of a portion of the detected surface sensor data to the computing device,
  in particular, wherein an initial processing and display of the detected surface sensor data is carried out based on the data streaming, providing scanning measurement data comprising,
rotation of the support about the support axis of rotation,
rotation of the beam steering unit about the beam axis of rotation,
emitting the distance measurement radiation and receiving returning parts of the distance measurement radiation for detecting distance measurement data, wherein associated first and second angle data are detected during the detection of distance measurement data, and the detection of the distance measurement data comprises a data processing of exclusively received, namely unprocessed, surface sensor raw data, and
data streaming of a portion of the detected scanning measurement data to the computing device,
initial processing of the parts of the surface sensor data and scanning measurement data transmitted by means of data streaming, and
displaying the parts of the surface sensor data and scanning measurement data associated by means of data streaming in the form of a colored 3D point cloud.
in particular, wherein the data processing of the distance measurement raw data comprises a consideration of parameters dependent on the first and/or second angle data as part of referencing the measurement data with respect to a common coordinate system.

A further embodiment relates to the fact that the laser scanner and the computing device are configured in such a way that by means of a monitoring and control unit on the computing device, control signals can be transmitted to the laser scanner, in particular wirelessly, specifically by means of a WLAN or Bluetooth connection.

A further embodiment relates to the fact that the computing device is equipped with an inertial measurement system and/or tilt sensors, so that on the basis of a location of the computing device, in particular a position and/or orientation, an adjustment of a rotational position of the support about the support axis of rotation and/or an adjustment of a rotational position of the beam steering unit about the beam axis of rotation is carried out, in particular substantially synchronously with a change in position of the computing device, in particular wherein by adjustment of at least a first position of the computing device at least one region of interest of the environment can be defined, in particular wherein settings defined for the at least one region of interest for the detection of measurement data and/or defined settings for the display of parts of the processed measurement data can be made, in particular wherein the defined setting for the detection of measurement data comprises a measurement resolution of the surface sensor and/or a measurement accuracy of the distance measuring device and/or a scanning resolution of the distance measuring device, and/or the defined setting for the display of portions of the processed measurement data comprises a display resolution and/or a color setting and/or a gray value setting and/or a defined highlighting relative to a sub-region within the region of interest.

A further embodiment relates to the fact that the computing device is configured in such a way that auxiliary data can be accessed for processing the measurement data and/or displaying portions of the processed measurement data, in particular wherein the auxiliary data are invoked for a visual display in the form of an augmented reality and/or in the form of a virtual reality.

A further embodiment relates to the fact that the laser scanner comprises a position determination unit for providing referencing data, in particular position and/or orientation of the laser scanner unit, having at least one element of the following group: an inertial measurement system, a tilt sensor for detecting at least one tilt with respect to the direction of gravity, a receiver for a global satellite navigation system and/or for a pseudo-satellite navigation system, a compass, in particular an electronic compass, and a barometer, wherein the measurement data also include the referencing information, and/or the data processing is based on a procedure for simultaneous localization and mapping (SLAM).

A further aspect of some embodiments of the invention, taken separately or in combination with the other embodiments of the invention, relate to a laser scanner for optical measurement of an environment, comprising an optical distance measuring device for the detection of distance measurement data, with a transmitter unit for emitting a distance measurement radiation and a receiver unit for receiving returning parts of the distance measurement radiation, a surface sensor for detecting surface sensor data, in particular at least one color camera for recording image data, wherein the sensor defines an optical axis of the sensor and a viewing direction of the sensor along the optical axis, a base, a support which is fixed to the base such that it can rotate about a support axis of rotation, in particular a slow axis of rotation, a beam steering unit for the distance measurement radiation which is fixed to the support such that it can rotate about a beam axis of rotation, in particular a fast axis of rotation, substantially orthogonal to the support axis of rotation, a first angle encoder for detecting data relating to a first rotation of the support about the support axis of rotation and a second angle encoder for detecting data relating to a rotation of the beam steering unit about the beam axis of rotation, wherein the distance measurement data, the surface sensor data and the first and second angle data, hereafter referred to as measurement data, are detected as part of a measurement process which comprises a scanning sensing by means of the distance measuring device with a defined progressive, in particular continuous, rotation of the support about the support axis of rotation, with a defined progressive, in particular continuous, rotation of the beam steering unit about the beam axis of rotation, and with a continuous emission of the distance measurement radiation and a continuous reception of returning parts of the distance measurement radiation, and multiple reading of the surface sensor with respect to different viewing directions of the sensor.

The aspect of some embodiments of the invention is characterized in that by means of a virtual 360-degree rotation of the beam steering unit about the beam axis of rotation a scanning plane of the distance measurement radiation is defined, and the surface sensor is arranged and oriented on the support in such a way that its azimuthal viewing direction and the azimuthal orientation of the scanning plane are different, in the sense that a virtual backwards extension of the optical axis of the surface sensor cuts the scanning plane under a defined cutting angle, in particular wherein the cutting angle is at least 45 degrees, specifically wherein the scanning plane is not captured by the field of view of the surface sensor, wherein a fully automated first pre-programmed measurement process with defined steps is carried out according to the following temporal sequence:
recording of surface sensor data comprising
rotation of the support about the support axis of rotation, and reading out the surface sensor for detecting surface sensor data, in particular, wherein an initial processing and display of the surface sensor data is carried out, recording of scanning measurement data, namely distance measurement data and associated first and second angle data, comprising, rotation of the support about the support axis of rotation, rotation of the beam steering unit about the beam axis of rotation, and emitting the distance measurement radiation and receiving returning parts of the distance measurement radiation for detecting distance measurement data, wherein associated first and second angle data are detected during the detection of distance measurement data.

One embodiment relates to the fact that a second preprogrammed measurement process with defined steps is carried out according to the following temporal sequence:

providing a first set of surface sensor data, in particular surface sensor data with reduced resolution, comprising rotation of the support about the support axis of rotation, and reading out the surface sensor for detecting surface sensor data, derivation of a surface sensor exposure time based on the first set of surface sensor data, and providing a second set of surface sensor data, based on the exposure time of the surface sensor, comprising rotation of the support about the support axis of rotation, and reading from the surface sensor for detecting surface sensor data, A further embodiment relates to the fact that an at least initial processing of parts of the measurement data is performed during the measurement process, in particular an association of the sampled measurement data and the surface sensor data, in particular wherein the display of portions of the processed measurement data takes place during the measurement process and is progressively, in particular continuously, updated based on the processed measurement data, in particular supplemented and/or replaced, specifically wherein a display coupled or integrated with the laser scanner is provided for the display.

A further embodiment relates to the fact that based on the surface sensor data at least one region of interest of the environment can be defined, in particular wherein for the at least one region of interest, defined settings for the detection of measurement data and/or defined settings for the display of portions of the processed measurement data can be made.

A further embodiment relates to the fact that as part of the measurement process a complete detection of all surface sensor data required for the measurement process takes place before the acquisition of sampled measured data begins, in particular wherein based on the detected surface sensor data a 2D panorama display of at least one partial region of the environment is generated, or a 2D full-dome projection is generated.

A further aspect of some embodiments of the invention, taken alone or in combination with the other embodiments of the invention, relate to a measurement system for optical measurement of an environment, having a laser scanner for the collection of measurement data, a processing unit for processing of parts of the measurement data into processed measurement data, and a display unit for a defined display of portions of the processed measurement data which represent at least a partial region of the environment, wherein the laser scanner comprises an optical distance measuring device for recording distance measurement data, with a transmitter unit for emitting a distance measurement radiation and a receiver unit for receiving returning parts of the distance measurement radiation, a support, a beam steering unit for the distance measurement radiation, which is fixed to the support such that it can rotate about a beam axis of rotation, in particular a fast axis of rotation, an angle encoder for detecting data relating to a rotation of the beam steering unit about the beam axis of rotation, wherein the measurement data comprise the distance measurement data and the angle data.

The aspect of the embodiment of invention is characterized in that a central reference point of the laser scanner is defined as the origin for distance and angle measurement, in particular by the intersection point of the beam axis of rotation with a support axis of rotation for a rotation of the support about a base, an infrared sensor sensitive in the infrared wavelength range is integrally arranged on the support, wherein the infrared sensor defines an optical axis of the infrared sensor and a viewing direction of the infrared sensor along the optical axis, and a position of the infrared sensor and an orientation of its optical axis with respect to the beam steering unit and the central reference point is known, the measurement data comprise infrared data detected with the infrared sensor, and the measurement data are associated with the infrared data, in particular so that temperature information is taken into account for the display of portions of the processed data.

A further embodiment relates to the fact that the display of portions of the processed measurement data is generated in the form of a colored 3D point cloud and the temperature information is stored in the 3D point cloud and/or displayed with a defined color coding.

A further aspect of the invention, taken either alone or in combination with the previously mentioned aspect of the invention, relates to a laser scanner for optical measurement of an environment, comprising an optical distance measuring device for detecting distance measurement data, having a transmitter unit for emitting a distance measurement radiation and a receiver unit for receiving returning parts of the distance measurement radiation, a support, a beam steering unit for the distance measurement radiation, which is fixed to the support such that it can rotate around a beam axis of rotation, in particular a fast axis of rotation, and an angle encoder for detecting angle data with respect to a rotation of the beam steering unit about the beam axis of rotation, wherein the distance measurement data and the angle data, hereafter designated as measurement data, are detected during a measurement process which comprises a scanning sensing by means of the distance measuring device with a defined progressive, in particular continuous, rotation of the beam steering unit about the beam axis of rotation, and with a continuous emission of the distance measurement radiation and a continuous reception of returning parts of the distance measurement radiation.

The aspect of this embodiment the invention is characterized in that the laser scanner only has a single integrated control element (e.g. a single button, also in the form of a touch-screen button or a single switch), the control element has only a single active and a single inactive state and can be switched by way of an external action in order to occupy the active or inactive state, a set of defined measurement programs and/or actions of the laser scanner is stored, and individual measurement programs and/or actions from the set of defined measurement programs and/or actions are triggered based on at least one element from the following group:

change of the state of the control element from the inactive to the active state, change of the state of the control element from the active to the inactive state, switching of the control element by means of a persistent external action during a defined time interval, a coded sequence of state changes of the control element between the active and inactive state, and a coded sequence of temporally persistent external actions on the control element over defined time intervals.

One embodiment relates for example to the fact that the set of defined measurement programs and/or actions of the laser scanner comprises activating the laser scanner, as well as at least one element from the following group: deactivation of the laser scanner, starting the measurement process, interrupting the measurement process, aborting the measurement process and restarting the measurement process; in particular, wherein a set of different settings for the measurement process is stored and/or can be defined and the set of defined measurement programs and/or actions of the laser scanner unit also comprises at least one element of the following group: adjusting a setting from the set of settings for the measurement process, starting the measurement process with a setting from the set of settings for the measurement process, and restoring a default setting of the laser scanner, in particular a default startup configuration of the laser scanner.

A further embodiment relates, for example, to the fact that the coded sequence of state changes of the control element is defined by a definite number of state changes during a defined time interval between the active and inactive state, and/or the coded sequence of temporally persistent external actions is defined by one or more differently defined time intervals for maintaining the external action.

A further aspect of some embodiments of the invention, taken either alone or in combination with the other embodiments of the invention, relate to a laser scanner for optical measurement of an environment, comprising an optical distance measuring device for detecting distance measurement data, having a transmitter unit for emitting a distance measurement radiation and a receiver unit for receiving returning parts of the distance measurement radiation, a surface sensor for detecting surface sensor data, in particular at least one color camera for recording image data, wherein the sensor defines an optical axis of the sensor and a viewing direction of the sensor along the optical axis, a support, a beam steering unit for the distance measurement radiation, which is fixed to the support such that it can rotate around a beam axis of rotation, in particular a fast axis of rotation, an angle encoder for detecting angle data with respect to a rotation of the beam steering unit about the beam axis of rotation, wherein the distance measurement data, the surface sensor data and the first and second angle data, hereafter designated as measurement data, are detected during a measurement process which comprises a scanning sensing by means of the distance measuring device with a defined progressive, in particular continuous, rotation of the beam steering unit about the fast axis of rotation, and with a continuous emission of the distance measurement radiation and a continuous reception of returning parts of the distance measurement radiation, and multiple readings of the surface sensor with respect to different viewing directions of the sensor.

The aspect of some embodiments of the invention is characterized in that a central reference point of the laser scanner is defined as the origin for distance and angle measurement, in particular by the intersection point of the beam axis of rotation with a support axis of rotation for a rotation of the support about a base, the surface sensor being fixedly arranged on the support with a stationary field of view relative to the support and facing away from the support, in the sense that the field of view of the sensor changes during the measurement process only in the event of a movement of the support, in particular a rotation of the support about the beam axis of rotation, and a virtual backward extension of the optical axis of the surface sensor passes through the central reference point.

One embodiment relates for example to the fact that a multiplicity of surface sensors is arranged on the support, wherein for each one of the multiplicity of surface sensors the virtual backward extension of its optical axis substantially passes through the central reference point.

A further embodiment relates for example to the fact that a scanning plane of the distance measurement radiation is defined by a virtual 360-degree rotation of the beam steering unit about the beam axis of rotation, and one of the multiplicity of surface sensors is arranged in such a way that its visual field cone intersects the scanning plane, in particular wherein the support is fixed on a base such that it can rotate about a support axis of rotation, in particular a slow axis of rotation, and the visual field cone of the surface sensor intersects with the steepest elevational orientation of the optical axis with a virtual extension of the support axis of rotation.

A further embodiment relates, for example, to the fact that the support is fixed on a base such that it can rotate about a support axis of rotation, in particular a slow axis of rotation, the laser scanner comprises a further angle encoder for detecting further angle data as measurement data relating to a rotation of the support about the support axis of rotation, the measurement also comprises multiple readings from the multiplicity of surface sensors with respect to different azimuthal viewing directions of the individual sensors, and the multiplicity of surface sensors are arranged in such a way that during the measurement process they enable a full-dome measurement, in particular wherein the visual field cone of the surface sensor intersects with the steepest elevational orientation of the optical axis with a virtual extension of the support axis of rotation, wherein the multiplicity of surface sensors define a minimum detection radius for the full-dome measurement in such a way that a spherical surface is defined by the central reference point and the minimum detection radius with the central reference point at the center, and during the measurement process at least one hemispherical surface defined by the spherical surface can only just be scanned by the multiplicity of surface sensors, in particular wherein by means of the multiplicity of surface sensors a partial surface of the sphere can be scanned that is larger than the hemispherical surface.

A further aspect of some embodiments of the invention, taken either alone or in combination with the other embodiments of the invention, relate to a laser scanner for optical measurement of an environment, comprising an optical distance measuring device for detecting distance measurement data, having a transmitter unit for emitting a distance measurement radiation and a receiver unit for receiving returning parts of the distance measurement radiation, a surface sensor for detecting surface sensor data, in particular at least one color camera for recording image data, wherein the sensor defines an optical axis of the sensor and a viewing direction of the sensor along the optical axis, a support, a beam steering unit for the distance measurement radiation, which is fixed to the support such that it can rotate around a beam axis of rotation, in particular a fast axis of rotation, an angle encoder for detecting angle data with respect to a rotation of the beam steering unit about the beam axis of rotation, wherein the distance measurement data, the surface sensor data and the first and second angle data, hereafter designated as measurement data, are detected during a measurement process which comprises a scanning sensing by means of the distance measuring device with a defined progressive, in particular continuous, rotation of the beam steering unit about the fast axis of rotation, and with a continuous emission of the distance measurement radiation and a continuous reception of returning parts of the distance measurement radiation, and multiple readings of the surface sensor with respect to different viewing directions of the sensor.

The aspect of some embodiments of the invention is characterized in that a central reference point of the laser scanner is defined as the origin for distance and angle measurement, in particular by the intersection point of the beam axis of rotation with a support axis of rotation for a rotation of the support about a base, a multiplicity of surface sensors with different elevational orientation of the optical axis are fixedly arranged on the support, in the sense that the fields of view of the sensors during the measurement process only change in the event of a movement of the support, in particular a rotation of the support about the beam axis of rotation, and for each one of the plurality of surface sensors the virtual backwards extension of its optical axis substantially passes through the central reference point.

One embodiment relates for example to the fact that the multiplicity of surface sensors are arranged with the same azimuthal direction, in particular wherein a scanning plane of the distance measurement radiation is defined by means of a virtual 360-degree rotation of the beam steering unit about the beam axis of rotation and the optical axes of the multiplicity of surface sensors are arranged in a plane outside the scanning plane.

A further embodiment relates, for example, to the fact that the visual field cone of the surface sensor with the steepest elevation orientation of the optical axis intersects with the scanning plane at a distance of between 0.25 and 7 m from the central reference point.

A further aspect of the invention, taken either alone or in combination with the other aspects of the invention, relates to a laser scanner for optical measurement of an environment, comprising an optical distance measuring device for detecting distance measurement data, having a transmitter unit for emitting a distance measurement radiation and a receiver unit for receiving returning parts of the distance measurement radiation, a surface sensor for detecting surface sensor data, in particular at least one color camera for recording image data, wherein the sensor defines an optical axis of the sensor and a viewing direction of the sensor along the optical axis, a support, a beam steering unit for the distance measurement radiation, which is fixed to the support such that it can rotate around a beam axis of rotation, in particular a fast axis of rotation, an angle encoder for detecting angle data with respect to a rotation of the beam steering unit about the beam axis of rotation, wherein the distance measurement data, the surface sensor data and the first and second angle data, hereafter designated as measurement data, are detected during a measurement process which comprises a scanning sensing by means of the distance measuring device with a defined progressive, in particular continuous, rotation of the beam steering unit about the fast axis of rotation, and with a continuous emission of the distance measurement radiation and a continuous reception of returning parts of the distance measurement radiation, and multiple readings of the surface sensor with respect to different viewing directions of the sensor.

The aspect of some embodiments of the invention is characterized in that the laser scanner comprises a lamp illuminating the field of view of the surface sensor, in particular one or more LEDs, wherein the lamp defines an optical axis of the lamp and an illumination direction of the lamp along the optical axis of the lamp, and the lamp is used for a selectively controllable illumination, substantially directed onto the field of view of the surface sensor.

One embodiment relates, for example, to the fact that the surface sensor is arranged on the support and the lamp is arranged on the support directly next to the surface sensor, in particular with a maximum lateral offset between the optical axis of the lamp and the optical axis of the surface sensor of 4 cm.

A further embodiment relates, for example, to the fact that the lamp substantially emits white light, which means broadband light in the visible wavelength range, in particular by the lamp being designed as a dual LED, namely an LED couplet with two separate LEDs differing with respect to their emitted spectral range.

A further embodiment relates, for example, to the fact that a multiplicity of surface sensors is arranged on the support, wherein each of the multiplicity of surface sensors is assigned controllable lamps specific to said sensor, substantially illuminating the field of view of said sensor.

A further embodiment relates, for example, to the fact that a first set of surface sensor data is detected, in particular surface sensor data with reduced resolution, a set of illumination settings for the lamp is derived based on the first set of surface sensor data, and a second set of surface sensor data is recorded based on the set of illumination settings, in particular wherein the first set of surface sensor data is detected without using the lamp or else using a uniform illumination by the lamp.

A further aspect of some embodiments of the invention, taken separately or in combination with the other embodiments of the invention, relate to a laser scanner for optical measurement of an environment, comprising an optical distance measuring device for the detection of distance measurement data, with a transmitter unit for emitting a distance measurement radiation and a receiver unit for receiving returning parts of the distance measurement radiation, a base, a support which is fixed to the base such that it can rotate about a support axis of rotation, in particular a slow axis of rotation, a beam steering unit for the distance measurement radiation which is fixed to the support such that it can rotate about a beam axis of rotation, in particular a fast axis of rotation, substantially orthogonal to the support axis of rotation, a first angle encoder for detecting data relating to a first rotation of the support about the support axis of rotation and a second angle encoder for detecting data relating to a rotation of the beam steering unit about the beam axis of rotation, wherein the distance measurement data and the first and second angle data, hereafter referred to as measurement data, are detected as part of a measurement process which comprises a scanning sensing by means of the distance measuring device with a defined progressive, in particular continuous, rotation of the support about the support axis of rotation, with a defined progressive, in particular continuous, rotation of the beam steering unit about the beam axis of rotation, and with a continuous emission of the distance measurement radiation and a continuous reception of returning parts of the distance measurement radiation.

The aspect of some embodiments of the invention is characterized in that the base comprises only one overall effective stabilization region axially along the support axis of rotation, which is used to stabilize the support against a tilting of the support relative to the base, the stabilization region has a first extension axially along the support axis of rotation and a second extension perpendicular to the support axis of rotation and substantially radially symmetric with respect to the support axis of rotation, and the second extension is larger than the first extension.

One embodiment relates, for example, to the fact that the support is mounted by means of a single bearing rim such that it can pivot relative to the base about the support axis of rotation, wherein the stabilization is achieved exclusively by the single bearing rim.

A further embodiment relates, for example, to the fact that the bearing rim is designed as a single-row four-point roller bearing, or the bearing rim is designed as a single-row sliding bearing with an outer and inner ring and the outer ring forms two contact bearings with the inner ring, in particular two bearing lines or two bearing surfaces, axially spaced apart with respect to the support axis of rotation.

A further embodiment relates, for example, to the fact that the stabilization is generated by means of a spring loading acting radially on the bearing rim with respect to the support axis of rotation.

A further embodiment relates, for example, to the fact that the second extension is greater than the first extension by at least a factor of two, in particular wherein the second extension is greater than the first extension by at least a factor of five, specifically wherein the second extension is greater than the first extension by at least a factor of ten.

A further embodiment relates, for example, to the fact that a lubricant-repellent emulsion is applied along a boundary region substantially parallel to a contact bearing, so that a dispersion of a lubricant for the bearing rim due to the surface tension of the lubricant-repellent emulsion is substantially limited by the boundary region, or the bearing rim is designed as a four-point roller bearing in the form of a dry-running ring bearing with ceramic roller elements.

A further aspect of the invention, taken separately or in combination with the other aspects of the invention, relates to a laser scanner for optical measurement of an environment, comprising an optical distance measuring device for the detection of distance measurement data, with a transmitter unit for emitting a distance measurement radiation and a receiver unit for receiving returning parts of the distance measurement radiation, a base, a support which is fixed to the base such that it can rotate about a support axis of rotation, in particular a slow axis of rotation, a beam steering unit for the distance measurement radiation which is fixed to the support such that it can rotate about a beam axis of rotation, in particular a fast axis of rotation, substantially orthogonal to the support axis of rotation, a first angle encoder for detecting data relating to a first rotation of the support about the support axis of rotation and a second angle encoder for detecting data relating to a rotation of the beam steering unit about the beam axis of rotation, wherein the distance measurement data and the first and second angle data, hereafter referred to as measurement data, are detected as part of a measurement process which comprises a scanning sensing by means of the distance measuring device with a defined progressive, in particular continuous, rotation of the support about the support axis of rotation, with a defined progressive, in particular continuous, rotation of the beam steering unit about the beam axis of rotation, and with a continuous emission of the distance measurement radiation and a continuous reception of returning parts of the distance measurement radiation.

The aspect of some embodiments of the invention is characterized in that, with respect to a rotation of the support about the support axis of rotation the base is designed exclusively as a passive element, in the sense that all active electronics required for the motorization of the rotation around the support axis of rotation is arranged exclusively in the support and co-rotates with the support around the axis of rotation of the support, in particular wherein each of the following components is arranged entirely in the support and co-rotates with the support about the support axis of rotation: an active drive element for the rotation of the support about the support axis of rotation, in particular a rotary motor with a drive shaft coupled to the motor or an electrical coil element for a radial interaction with respect to the support axis of rotation between the electrical coil element and a passive magnetic element in the base, and a power supply unit for the active drive element.

One embodiment relates, for example, to the fact that for the rotation of the support about the support axis of rotation, a rotary motor arranged in the support is designed with a drive shaft coupled to the motor, the drive shaft runs axially with an offset relative to the support axis of rotation substantially parallel to the support axis of rotation, the base comprises a circular symmetrical bearing surface around the support axis of rotation, an idle wheel is arranged on the drive shaft, in particular with a rubber ring, which is operatively connected to the bearing surface in such a way that during rotation of the drive shaft the idle wheel runs along the bearing surface and the support therefore rotates about the support axis of rotation with respect to the base, in particular wherein the bearing surface defines a virtual circle and the idle wheel is arranged inside the circle.

A further embodiment relates, for example, to the fact that the following components as a whole are additionally arranged in the support and operated by means of the power supply unit: the optical distance measuring device, the surface sensor, a monitoring and control unit, and electronics of the first and second angle encoders, in particular wherein the base and the support are designed in such a way that during the measurement process no electrical power transmission and no electrical signal transmission takes place between the base and the support.

A further embodiment relates, for example, to the fact that the laser scanner comprises a total of only one power supply unit, namely the power supply unit for the active drive element, which is arranged in the support, in particular wherein the base is permanently and irreversibly electrically decoupled from the support, such that no electrical power transmission takes place between the support and the base.

A further embodiment relates, for example, to the fact that the laser scanner comprises a wireless signal transmission unit, in particular, based on a WLAN or Bluetooth connection, wherein the signal transmission unit as a whole is arranged in the support, wherein a two-way transmission of measurement data and/or auxiliary data is provided between the laser scanner and an external control unit and/or a transmission of a portion of the measurement data from the laser scanner to an external computing and/or storage unit is provided, in particular wherein a two-way transmission of measurement data and/or auxiliary data is provided between the laser scanner and the external computing and/or storage unit.

A further embodiment relates for example to the fact that the transmission of the measurement and/or auxiliary data is carried out substantially parallel to the measurement process by means of a data streaming of parts of the measurement data, which is started simultaneously with respect to the start of the measurement process, or at least almost simultaneously.

A further aspect of the invention, taken separately or in combination with the previously mentioned aspects of the invention, relates to a laser scanner for optical measurement of an environment, comprising an optical distance measuring device for the detection of distance measurement data, with a transmitter unit for emitting a distance measurement radiation and a receiver unit for receiving returning parts of the distance measurement radiation, a base, a support which is fixed to the base such that it can rotate about a support axis of rotation, in particular a slow axis of rotation, a beam steering unit for the distance measurement radiation which is fixed to the support such that it can rotate about a beam axis of rotation, in particular a fast axis of rotation, substantially orthogonal to the support axis of rotation, a first angle encoder for detecting data relating to a first rotation of the support about the support axis of rotation, and a second angle encoder for detecting data relating to a rotation of the beam steering unit about the beam axis of rotation, wherein the distance measurement data and the first and second angle data, hereafter referred to as measurement data, are detected as part of a measurement process which comprises: a scanning sensing by means of the distance measuring device with a defined progressive, in particular continuous, rotation of the support about the support axis of rotation, a defined progressive, in particular continuous, rotation of the beam steering unit about the beam axis of rotation, and with a continuous emission of the distance measurement radiation and a continuous reception of returning parts of the distance measurement radiation.

The aspect of some embodiments of the invention is characterized in that for the rotation of the support about the support axis of rotation, a rotary motor arranged in the support is designed with a drive shaft coupled to the motor, the drive shaft runs axially with an offset relative to the support axis of rotation substantially parallel to the support axis of rotation, the base comprises a circular symmetrical bearing surface around the support axis of rotation, an idle wheel is arranged on the drive shaft, in particular with a rubber ring, which is operatively connected to the bearing surface in such a way that during rotation of the drive shaft the idle wheel runs along the bearing surface and the support therefore rotates about the support axis of rotation with respect to the base, in particular wherein the bearing surface defines a virtual circle and the idle wheel is arranged inside the circle.

A further aspect of some embodiments of the invention, taken either alone or in combination with the previously mentioned embodiments of the invention, relate to a laser scanner for optical measurement of an environment, comprising an optical distance measuring device for detecting distance measurement data, having a transmitter unit for emitting a distance measurement radiation and a receiver unit for receiving returning parts of the distance measurement radiation, a support, a beam steering unit for the distance measurement radiation, which is fixed to the support such that it can rotate around a beam axis of rotation, in particular a fast axis of rotation, and an angle encoder for recording angle data with respect to a rotation of the beam steering unit about the beam axis of rotation.

The aspect of some embodiments of the invention is characterized in that the beam steering unit is connected to a shaft mounted in the support connected along the beam axis of rotation, in particular wherein the shaft penetrates into the beam steering unit with a defined penetration depth or is designed integrally with the beam steering unit, a bell-shaped element is arranged on the shaft, in particular wherein the bell-shaped element is arranged in a fixed position on the shaft or is formed integrally with the shaft, wherein the bell-shaped element defines a bell-shaped body and a bell-shaped back, passive magnetic elements of a drive are arranged in the bell-shaped body for rotating the shaft, active drive elements of the drive are arranged anchored in the support for generating an electromagnetic interaction with the passive magnetic elements, in particular electrical coil elements, wherein the active drive elements at least partially protrude into the bell-shaped body, and by means of a radial interaction between the active drive elements and the passive magnetic elements the shaft and therefore the beam steering unit undergo a defined rotational motion around the beam axis of rotation.

One embodiment relates, for example, to the fact that the active drive elements are fully recessed into the bell-shaped body.

A further embodiment relates, for example, to the fact that at least one rim of the bearing for mounting the shaft in the support protrudes into the bell-shaped body.

A further embodiment relates, for example, to the fact that the rim of the bearing protruding into the bell-shaped body is designed as a roller bearing rim and roller bodies of the roller bearing rim protrude at least partially into the bell-shaped body.

A further embodiment relates, for example, to the fact that at least one rim of the bearing for mounting the shaft in the support protrudes into the beam steering unit, in particular wherein the rim protruding into the beam steering unit is designed as a roller bearing rim and roller bodies of the roller bearing rim protrude at least partially into the beam steering unit.

A further embodiment relates, for example, to the fact that the shaft comprises only a single effective stabilization region axially along the beam axis of rotation, which is used to stabilize the shaft against a tilting of the shaft relative to the support, wherein the beam steering unit, the bell-shaped element and the shaft are designed and arranged with respect to each other in such a way that their common center of gravity axially along the beam axis of rotation is located in the stabilization region, in particular wherein the stabilization is achieved exclusively by a bearing which substantially axially-symmetrically surrounds the center of gravity for mounting the shaft in the support.

A further embodiment relates, for example, to the fact that a coding element for the angle encoder is arranged on the back of the bell-shaped element, in particular wherein the coding element is designed integrally with the bell-shaped element.

A further embodiment relates, for example, to the fact that at least one of the following connections is made exclusively by means of an adhesive bonding and/or compression: a connection of the shaft to the stabilization element, a connection of the shaft to the bell-shaped element, a connection of the passive magnetic element to the bell-shaped element, and a connection of the coding element to the bell-shaped element.

A further aspect of some embodiments of the invention, taken either alone or in combination with the previously mentioned embodiments of the invention, relates to a laser scanner for optical measurement of an environment, comprising an optical distance measuring device for detecting distance measurement data, having a transmitter unit for emitting a distance measurement radiation and a receiver unit for receiving returning parts of the distance measurement radiation, a support, a beam steering unit for the distance measurement radiation, which is fixed to the support such that it can rotate around a beam axis of rotation, in particular a fast axis of rotation, and an angle encoder for recording angle data with respect to a rotation of the beam steering unit about the beam axis of rotation.

The aspect of some embodiments of the invention is characterized in that the beam steering unit is axially mounted in the support along the beam axis of rotation via a shaft, wherein the beam steering unit comprises a mirrored surface for a deflection of the distance measurement radiation, in particular a plane mirrored surface which is tilted by 45° with respect to the beam axis of rotation, or a tilted parabolic mirrored surface, the shaft has a penetration region at one end, the beam steering unit has an enclosure region for enclosing the penetration region of the shaft during a coupling of the beam steering unit to the shaft, the enclosure region has a shape which is suitable for enclosing the shaft over a length of the penetration region during the coupling in such a way that in the coupled condition a gap with a defined width exists between the shaft and the enclosure region of the beam steering unit, the enclosure region comprises a stabilization element that can be pressed in the gap for tolerance compensation and for the stable connection of the beam steering unit to the shaft, in an uncoupled condition the stabilization element has a thickness which is greater than the width of the gap, and the beam steering unit, in particular the enclosure region, the shaft and the stabilization element are designed in such a way and interact in such a way that during the coupling of the beam steering unit to the shaft the stabilization element arranged between the enclosure region and the shaft is pressed into the gap, and in the coupled condition is present in the gap in such a deformed state, in particular wherein at least a portion of the stabilization element is plastically deformed, that defined residual elastic forces radially to the beam axis of rotation act on the beam steering unit and the shaft, that the beam steering unit and the shaft are stabilized in relation to each other in the axial direction with respect to the beam axis of rotation, the beam steering unit is stabilized against a tilting relative to the shaft over a stabilization region defined by the length of the penetration region, and the residual elastic forces do not act on the mirrored surface, apart from a defined tolerance range.

For example, one embodiment relates to the fact that the stabilization element and the shaft are adhesively bonded to each other during the coupling.

A further embodiment relates, for example, to the fact that the enclosure region comprises at least two stabilization elements spaced apart in the axial direction with respect to the beam axis of rotation.

A further embodiment relates, for example, to the fact that the stabilization element is annular.

A further embodiment relates, for example, to the fact that the stabilization element is made of a material with homogeneous plastic properties, in particular with a homogeneous plastic flow region.

A further embodiment relates, for example, to the fact that the stabilizing element is integrated into the beam steering unit, in particular wherein the stabilization element is injection molded onto the beam steering unit or the beam steering unit and the stabilization element are integrally designed.

A further embodiment relates, for example, to the fact that the defined tolerance range for an effect of the residual elastic forces on the mirrored surface is selected in such a way that a surface accuracy of the mirrored surface of plus/minus 5 µm, in particular of plus/minus 3 µm, in particular of plus/minus 1 µm or of plus/minus 300 nm with respect to a defined ideal design for the mirrored surface is guaranteed.

A further aspect of some embodiments of the invention, taken either alone or in combination with the previously mentioned embodiments of the invention, relates to a laser scanner for optical measurement of an environment, comprising an optical distance measuring device for detecting distance measurement data, having a transmitter unit for emitting a distance measurement radiation and a receiver unit for receiving parts of the distance measurement radiation returning from the environment, a support, a beam steering unit for the distance measurement radiation, which is fixed to the support such that it can rotate around a beam axis of rotation, in particular a fast axis of rotation, wherein the beam steering unit comprises a mirrored surface for a deflection of the distance measurement radiation, in particular a plane mirrored surface which is tilted with respect to the beam axis of rotation, or a parabolic mirrored surface, and an angle encoder for detecting angle data with respect to a rotation of the beam steering unit about the beam axis of rotation, wherein the distance measurement data and the angle data, hereafter designated as measurement data, are detected during a measurement process which comprises a scanning sensing by means of the distance measuring device with a defined progressive, in particular continuous, rotation of the beam steering unit about the beam axis of rotation, and with a continuous emission of the distance measurement radiation and a continuous reception of returning parts of the distance measurement radiation.

The aspect of some embodiments of the invention is characterized in that a receiving optics for parts of the distance measurement radiation returning via the mirrored surface is arranged on the support, in particular wherein the optical axis of the receiving optics is aligned, specifically coaxially, with respect to the beam axis of rotation, an outlet area for the emission of the distance measurement radiation in the direction of the mirrored surface is arranged on the support and the outlet area has a lateral offset with respect to the optical axis of the receiving optics and the distance measurement radiation emitted by the outlet area is emitted onto the mirrored surface parallel to the optical axis of the receiving optics.

One embodiment relates, for example, to the fact that the receiving optics has a cutout or window, in particular a plane glass window, into which the outlet area is placed, or which forms the outlet area.

A further embodiment relates, for example, to the fact that the outlet area is arranged next to the receiving optics, in particular immediately adjoining the receiving optics.

A further embodiment relates, for example, to the fact that the outlet area is designed in such a way that, due to the geometry and orientation of the outlet area, the maximum beam diameter at the outlet area of the outgoing distance measurement radiation is substantially enclosed by the outlet area, in particular wherein the geometry and orientation of the outlet area substantially corresponds to the geometry and orientation of the beam waist (the beam cross-section) of the outgoing distance measurement radiation at the outlet area.

A further embodiment relates, for example, to the fact that the transmitter unit comprises a laser diode for generating the distance measurement radiation as laser radiation and the beam cross-section of the outgoing distance measurement radiation at the level of the outlet area has an oval shape, in particular an elliptical shape, in particular with a short semi-axis oriented in the direction of the lateral offset.

A further embodiment relates, for example, to the fact that the receiving optics also comprises a corrective optics to allow for a parallax effect caused by the lateral offset of the outlet area relative to the beam axis of rotation for parts of the distance measurement radiation returning from a distance which is shorter than a defined near-field distance, in particular wherein the corrective optics is implemented as a cylindrical lens.

A further embodiment relates, for example, to the fact that a compensation algorithm is provided in order to compensate for compensation parameters dependent on the angle data for a parallax effect with respect to outgoing and returning parts of the distance measurement radiation, during the continuous rotation of the beam steering unit about the beam axis of rotation and induced by the lateral offset of the outlet area with respect to the beam axis of rotation, in particular wherein the compensation parameters are taken into account as part of a referencing of the measurement data with respect to a common coordinate system.

A further embodiment relates, for example, to the fact that the outlet area and the compensation algorithm are designed in such a way that within a defined measurement tolerance for referencing the measurement data with respect to the common coordinate system, no further adjustment of the laser scanner is required in addition to the compensation algorithm for the compensation of the parallax effect.

A further embodiment relates, for example, to the fact that the outlet area and the receiving optics are arranged in such a way that a lateral offset of at least 0.5 cm exists between a virtual extension of the optical axis of the receiving optics and a central propagation axis of the distance measurement radiation at the height at which the distance measurement radiation impinges on the beam steering unit.

A further embodiment relates, for example, to the fact that the transmitter unit and the receiver unit are arranged on a common printed circuit board.

A further aspect of some embodiments of the invention, taken alone or in combination with the above-mentioned aspects of the invention, relates to an electronic laser distance measurement module for a distance measurement to a target object, in particular for use in a laser scanner, wherein the laser distance measurement module comprises a transmitter unit for generating transmission signals, in particular wherein the transmission signals are generated by pulsed laser radiation, a receiver unit for receiving parts of the transmission signals returning from the target object as received signals, a receiver circuit for conditioning and digitization of the received signals, so that a distance to the target object is ultimately derivable based on the signal propagation time method, and a controller for the transmitter unit and the receiver circuit.

The aspect of some embodiments of the invention is characterized in that the receiver circuit comprises a comparator stage for deriving a signal amplitude of a received signal, an amplifier stage for adjusting a signal amplitude, in particular by amplification or attenuation of an input signal, a first and a second analog-to-digital conversion stage, wherein the receiver circuit as well as the transmitter unit can be controlled by the controller in such a way that a continuous sequence of distance measurements under alternating use of the first and second analog-to-digital conversion stage comprises first distance measurement by means of the first analog-to-digital conversion stage, in particular based on a first signal packet of successive received signals, in particular based on a first signal packet of successive receive signals, second distance measurement by means of the second analog-to-digital conversion stage, in particular based on a second signal packet of successive received signals, use of a first reception signal as a test signal, use of a second reception signal as a measurement signal, feeding the test signal to the comparator stage and derivation of a signal amplitude of the test signal by the comparator stage, adjusting the amplifier stage for at least parts of the reception signals containing the measurement signal based on the derived signal amplitude of the test signal, so that at least the measurement signal is present as an input signal in the control range of the first and/or second analog-to-digital conversion stage downstream of the amplifier unit.

One embodiment relates, for example, to the fact that the receiver circuit also comprises an activation unit, by means of which a first adjustment is carried out, wherein the test signal is taken into account for the derivation of the distance to the target object, and a second adjustment is carried out, wherein the test signal is discarded for the derivation of the distance to the target object, in particular wherein a range of values for a usable signal amplitude of the test signal is defined, the signal amplitude of the sample signal derived by the comparator stage is compared with the range of values, and the activation unit is controlled based on the comparison of the signal amplitude with the range of values, that if the signal amplitude of the test signal is within the range of values, the test signal is taken into account for the derivation of the distance to the target object, and if the signal amplitude of the test signal is outside the value range, the test signal is discarded for the derivation of the distance to the target object.

A further embodiment relates, for example, to the fact that the adjustment of the amplifier unit and the derivation of the distance to the target object as part of a single distance measurement is based on a signal packet consisting of a maximum of three consecutive received signals.

A further embodiment relates, for example, to the fact that a received signal of an immediately preceding distance measurement from the plurality of distance measurements is used as a current test signal for a current distance measurement from the plurality of distance measurements, in particular wherein the most recently received signal of the immediately preceding distance measurement is used as the current test signal.

A further aspect of some embodiments of the invention, taken alone or in combination with the above-mentioned embodiments of the invention, relates to an electronic laser distance measurement module for a distance measurement to a target object, in particular for use in a laser scanner, wherein the laser distance measurement module comprises a transmitter unit for generating transmission signals, in particular wherein the transmission signals are generated by pulsed laser radiation, a receiver unit for receiving parts of the transmission signals returning from the target object as received signals, a receiver circuit for conditioning and digitization of the received signals, so that a distance to the target object is ultimately derivable based on the signal transit time method, and a controller for the transmitter unit and the receiver circuit.

The aspect of some embodiments of the invention is characterized in that the receiver circuit comprises a plurality, including at least a first and a second, of analog-to-digital conversion stages, wherein the controller is configured for controlling the receiver circuit and the transmitter unit in such a way that a continuous sequence of distance measurements comprises an alternating use of the plurality of analog-to-digital conversion stages, staggered one after the other and in alternate sequence, for one distance measurement each, wherein each analog-to-digital conversion stage of the plurality of analog-to-digital conversion stages has one closed sampling phase per distance measurement for sampling an incoming signal, in particular a pulse packet, and thereafter a closed output phase for outputting values sampled during the sampling phase, wherein during the alternating usage, the respective output phases of the first analog-to-digital conversion stage are temporally located in the respective sampling phases of the second analog-to-digital conversion stage, and the respective output phases of the second analog-to-digital conversion stage are temporally located in the respective sampling phases of the first or another of the plurality of analog-to-digital conversion stages.

A further aspect of some embodiments of the invention, taken either alone or in combination with the previously mentioned aspects of the invention, relates to a laser scanner for optical measurement of an environment, comprising an optical distance measuring device for detecting distance measurement data, having one of the above described distance measurement modules, a support, a beam steering unit for the distance measurement radiation, which is fixed to the support such that it can rotate about a beam axis of rotation, in particular a fast axis of rotation, and an angle encoder for detecting angle data with respect to a rotation of the beam steering unit about the beam axis of rotation, wherein the distance measurement data and the angle data, hereafter designated as measurement data, are detected during a measurement process which comprises a scanning sensing by means of the distance measuring device with a defined progressive, in particular continuous, rotation of the beam steering unit about the beam axis of rotation, and with a continuous emission of the distance measurement radiation and a continuous reception of returning parts of the distance measurement radiation.

A further aspect of some embodiments of the invention, taken separately or in combination with the other embodiments of the invention, relates to a laser scanner for optical measurement of an environment, comprising an optical distance measuring device for the detection of distance measurement data, with a transmitter unit for emitting a distance measurement radiation and a receiver unit for receiving returning parts of the distance measurement radiation, a base, a support which is fixed to the base such that it can rotate about a support axis of rotation, in particular a slow axis of rotation, a beam steering unit for the distance measurement radiation which is fixed to the support such that it can rotate about a beam axis of rotation, in particular a fast axis of rotation, substantially orthogonal to the support axis of rotation, a first angle encoder for detecting data relating to a first rotation of the support about the support axis of rotation and a second angle encoder for detecting data relating to a rotation of the beam steering unit about the beam axis of rotation, wherein the distance measurement data and the first and second angle data, hereafter referred to as measurement data, are detected as part of a measurement process which comprises a scanning sensing by means of the distance measuring device with a defined progressive, in particular continuous, rotation of the support about the support axis of rotation, with a defined progressive, in particular continuous, rotation of the beam steering unit about the beam axis of rotation, and with a continuous emission of the distance measurement radiation and a continuous reception of returning parts of the distance measurement radiation.

The aspect of some embodiments of the invention is characterized in that the support has a skeletal structure consisting of at least two separately detachable support structures as the skeletal parts, a first of the two support structures is rotatably mounted with respect to the base, a second support structure is coupled only to the first support structure, in particular based on a connection using normal pins, the first support structure has a superstructure extending in the direction of the support axis of rotation, by means of which a stable mounting of the second support structure with respect to a tilting of the second support structure relative to the support axis of rotation can be achieved, and the beam steering unit is mounted exclusively within the second support structure such that it can rotate with respect thereto.

One embodiment relates, for example, to the fact that the first support structure is based on an inverted T-shape, namely wherein a circular disk connected to the base or an annular disk connected to the base forms the T-crossbar, and the superstructure forms the T-vertical.

A further embodiment relates, for example, to the fact that the support has a third support structure as a further skeletal part, which is separately detachably fixed to the superstructure of the first support structure, the second and third support structure are each substantially based on a plate structure with one flat side, and the superstructure with two opposite contact sides pointing away from each other forms a holder, on the one hand for the flat side of the second support structure and, on the other hand, for the flat side of the third support structure.

A further embodiment relates, for example, to the fact that the laser scanner comprises a surface sensor for detecting surface sensor data, in particular, at least one color camera for recording image data, wherein the sensor defines an optical axis of the sensor and a viewing direction of the sensor along the optical axis, the distance measuring device is arranged in the second support structure, the surface sensor is arranged in the third support structure, and that the distance measuring device and/or the surface sensor is interchangeable in a modular fashion, in particular wherein the first or second or third or another support structure comprises a power supply unit for the distance measuring device and/or the surface sensor.

A further aspect of some embodiments of the invention, taken separately or in combination with the previously mentioned embodiments of the invention, relates to a laser scanner for optical measurement of an environment, comprising an optical distance measuring device for the detection of distance measurement data, with a transmitter unit for emitting a distance measurement radiation and a receiver unit for receiving returning parts of the distance measurement radiation, a base, a support which is fixed to the base such that it can rotate about a support axis of rotation, in particular a slow axis of rotation, a beam steering unit for the distance measurement radiation, which is fixed to the support such that it can rotate about a beam axis of rotation, in particular a fast axis of rotation substantially orthogonal to the support axis of rotation, a first angle encoder for detecting data relating to a first rotation of the support about the support axis of rotation and a second angle encoder for detecting data relating to a rotation of the beam steering unit about the beam axis of rotation, wherein the distance measurement data and the first and second angle data, hereafter referred to as measurement data, are detected as part of a measurement process which comprises a scanning sensing by means of the distance measuring device with a defined progressive, in particular continuous, rotation of the support about the support axis of rotation, with a defined progressive, in particular continuous, rotation of the beam steering unit about the beam axis of rotation, and with a continuous emission of the distance measurement radiation and a continuous reception of returning parts of the distance measurement radiation.

The aspect of some embodiments of the invention is characterized in that the laser scanner comprises a status indicator for an indication of a device status, in particular for indicating a status of the measurement process, the status indicator is arranged on the support, which means it co-rotates when the support rotates about the support axis of rotation, that the status display is designed in such a way that it appears substantially identical around its circumference with respect to the support axis of rotation in all azimuthal directions, so that irrespective of a rotational position of the support about the support axis of rotation, for a user of the laser scanner the same information provided by the status indicator is visible and readable from all horizontal user perspectives.

One embodiment relates for example to the fact that the status display is formed by means of individual lamps, which are arranged—in particular directly—adjacent with a substantially identical elevation over the full extent of the support.

A further embodiment relates, for example, to the fact that the status indicator is implemented by means of continuous and interruption-free lighting means, which substantially completely surround the support and the support axis of rotation, in particular wherein the lighting means are implemented as an LED ring.

A further embodiment relates, for example, to the fact that the status indicator is designed by means of a fiber-optic ring with at least one coupling input for light, in particular by means of two or four coupling inputs, wherein with increasing distance from the coupling input position along the fiber-optic ring the ratio of radiation, namely the radial light extraction, to transmission of the light along the fiber-optic ring increases.

A further embodiment relates, for example, to the fact that the status indicator is designed in such a way that the device status is disclosed to a user by means of a visual coding, in particular by means of a defined color coding of the status indicator and/or by means of a defined flash coding of the status indicator.

A further aspect of some embodiments of the invention, taken either alone or in combination with the previously mentioned aspects of the invention, relates to a laser scanner for optical measurement of an environment, comprising an optical distance measuring device for detecting distance measurement data, having a transmitter unit for emitting a distance measurement radiation and a receiver unit for receiving returning parts of the distance measurement radiation, a surface sensor for detecting surface sensor data, in particular, at least one color camera for recording image data, wherein the sensor defines an optical axis of the sensor and a viewing direction of the sensor along the optical axis, a support, a beam steering unit for the distance measurement radiation, which is fixed to the support such that it can rotate around a beam axis of rotation, in particular a fast axis of rotation, and an angle encoder for recording angle data with respect to a rotation of the beam steering unit about the beam axis of rotation.

The aspect of some embodiments of the invention is characterized in that the support is implemented by means of a skeletal structure, the support comprises a cover carried by the skeletal structure and detachable therefrom as a shell element, and the surface sensor is secured to the shell element and carried by the shell element.

One embodiment relates, for example, to the fact that the laser scanner comprises a multiplicity of surface sensors, each of which is separately mounted on the shell element and carried separately by the shell element, in the sense that each surface sensor of the multiplicity of surface sensors is carried separately and in each individual case by the shell element, in particular wherein the shell element is formed with aperture openings for the surface sensors, the individual surface sensors of the multiplicity of surface sensors are secured to the inside of the shell element and the individual surface sensors of the multiplicity of surface sensors in each case look through one of the aperture openings of the shell element.

A further aspect of some embodiments of the invention, taken separately or in combination with the previously mentioned embodiments of the invention, relates to a laser scanner for optical measurement of an environment, comprising an optical distance measuring device for the detection of distance measurement data, with a transmitter unit for emitting a distance measurement radiation and a receiver unit for receiving returning parts of the distance measurement radiation, a base, a support which is fixed to the base such that it can rotate about a support axis of rotation, in particular a slow axis of rotation, a beam steering unit for the distance measurement radiation which is fixed to the support such that it can rotate about a beam axis of rotation, in particular a fast axis of rotation, substantially orthogonal to the support axis of rotation, a first angle encoder for detecting data relating to a first rotation of the support about the support axis of rotation and a second angle encoder for detecting data relating to a rotation of the beam steering unit about the beam axis of rotation, wherein the distance measurement data and the first and second angle data, hereafter referred to as measurement data, are detected as part of a measurement process which comprises a scanning sensing by means of the distance measuring device with a defined progressive, in particular continuous, rotation of the support about the support axis of rotation, with a defined progressive, in particular continuous, rotation of the beam steering unit about the beam axis of rotation, and with a continuous emission of the distance measurement radiation and a continuous reception of returning parts of the distance measurement radiation.

The aspect of some embodiments of the invention is characterized in that the distance measuring device is designed in such a way that a measurement beam ensemble, formed from a multiplicity of individual distance measurement beams is emitted, in particular wherein the measurement beam ensemble is deflected during the measurement process via a mirrored surface of the beam steering unit common to the multiplicity of distance measurement beams.

One embodiment relates for example to the fact that the maximum divergence between adjacent individual beams of the measurement beam ensemble is less than 15 degrees, in particular less than 1 degree.

A further embodiment relates for example to the fact that the individual beams of the measurement beam ensemble are emitted from the support in the direction of the beam steering unit as a beam fan, forming a single-beam line, in particular wherein the single-beam line extends along a perpendicular to the beam axis of rotation and perpendicular to the support axis of rotation, in particular wherein the beam fan consists of a maximum of ten individual beams.

A further aspect of some embodiments of the invention, taken either alone or in combination with the previously mentioned embodiments of the invention, relates to a laser scanner for optical measurement of an environment, comprising an optical distance measuring device for detecting distance measurement data, having a transmitter unit for emitting a distance measurement radiation and a receiver unit for receiving returning parts of the distance measurement radiation, a support, a beam steering unit for the distance measurement radiation, which is fixed to the support such that it can rotate around a beam axis of rotation, in particular a fast axis of rotation, and an angle encoder for detecting angle data with respect to a rotation of the beam steering unit about the beam axis of rotation, wherein the measurement data comprise the distance measurement data and the angle data that are detected during a measurement process which comprises a scanning sampling by means of the distance measuring device with a defined progressive, in particular continuous, rotation of the beam steering unit about the beam axis of rotation, and with a continuous emission of the distance measurement radiation and a continuous reception of returning parts of the distance measurement radiation.

The aspect of some embodiments of the invention is characterized by a receiving element for receiving the base, wherein the receiving element can be detached from the base by means of a latching device, and wherein the locking device comprises a cutout portion on the base into which a ring is recessed, said ring having a circumferentially continuous cavity in its interior, and comprises a spigot on the receiving element, wherein the spigot comprises at least three latching bodies, wherein in a basic position of a release device the latching bodies push radially outwards in order to block the ability to detach the receiving element from the base by the fact that the latching bodies engage in the cavity, and the activation of the release device enables the latching bodies to radially escape into the spigot in order to allow the ability of the receiving element to detach from the base.

One embodiment relates for example to the fact that the cutout portion is designed to be cylindrical.

A further embodiment relates, for example, to the fact that the receiving element is a tripod head or is designed for attachment to a tripod head.

A further embodiment relates, for example, to the fact that a latching is designed as a rotation body, in particular as a sphere or an ellipsoid, a trapezoid, a pyramid, a trapezoid having rounded corners, or a pyramid having rounded corners.

A further embodiment relates for example to the fact that the latching bodies and the cavity are designed and matched to each other in such a manner that the engagement of the latching body in the cavity causes a self-centering of the base to occur, in particular a self-centering with respect to the support axis of rotation.

A further embodiment relates, for example, to the fact that the release device is arranged in the spigot and has at least one radial pin for activating the release device, an axial pin for blocking or allowing the detachment facility, and a tensioning spring to maintain the basic position, wherein the radial pin, the axial pin and the tensioning spring are operatively connected in such a way that in the initial state of the release device the axial pin forces the latching bodies radially outwards, and on activating the release device a displacement of the radial pin moves the axial pin towards the tensioning spring, and the axial pin releases space due to its displacement and therefore enables the radial escape of the latching bodies into the spigot.

A further embodiment relates, for example, to the fact that in the basic position, the axial pin presses the latching bodies into the cavity of the ring by means of a tensioning force due to the tensioning spring.

A further embodiment relates, for example, to the fact that each latching body has at least two points of contact with the cavity, in particular, at least one contact line with the cavity.

A further aspect of some embodiments the invention, in combination with the previously mentioned embodiments of the invention, relates to a laser scanner wherein an axial position calibration procedure is provided for deriving axial position calibration parameters, which are taken into account during a referencing of the measurement data in a common coordinate system, in particular wherein the axial position calibration procedure comprises measurement of an already known environment and/or known objects in the environment to be measured, in particular wherein for the axial position calibration procedure the laser scanner is arranged in a hollow test body with known spatial dimensions, and/or in a test environment and/or in the environment provided as part of the actual measurement process, a set of test objects with known positioning relative to each other and/or dimensioning are installed and measured as part of the axial position calibration process.

A further aspect of some embodiments of the invention, in combination with the previously mentioned embodiments of the invention, relates to a laser scanner, wherein during the measurement process the beam steering unit rotates about the beam axis of rotation with a rotation speed of at least 50 Hz, in particular of at least 100 Hz, specifically of at least 250 Hz, and/or during the measurement process the base rotates about the support axis of rotation with a rotation speed of at least 0.01 Hz, in particular of at least 0.02 Hz, specifically of at least 0.03 Hz.

A further aspect of some embodiments of the invention, in combination with the previously mentioned embodiments, relates to a laser scanner, wherein during the measurement process, based on the rotation speed of the beam steering unit about the beam axis of rotation and based on a pulse frequency of the distance measurement radiation, a minimum sampling point density of at least 3 points per 1° angle of rotation is set.

BRIEF DESCRIPTION OF THE DRAWINGS

The system according to the invention and the laser scanner according to the invention are described in detail in the following in a purely exemplary way by reference to exemplary embodiments shown schematically in the drawings. Identical elements are labelled with the same reference numerals in the figures. The described embodiments are generally not shown true to scale and they are also not to be interpreted as limiting the invention.

Individually, they show.

DETAILED DESCRIPTION

Figure 1:
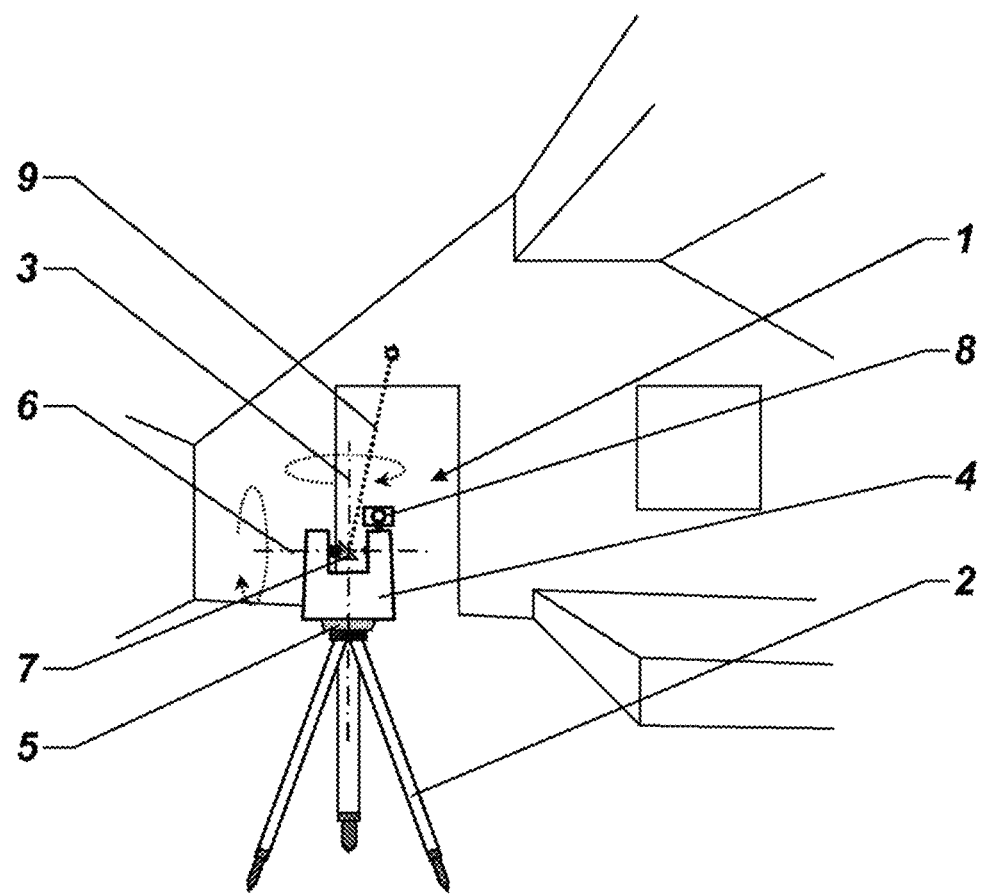
FIG. 1: a typical laser scanner according to the prior art for measuring a room.

FIG. 1 shows a typical laser scanner 1 according to the prior art, here with two rotational axes, for example mounted on a tripod 2, wherein the laser scanner 1 comprises a slow (vertical) axis of rotation—also referred to as the support axis of rotation 3—for an azimuthal rotation of the laser scanner 1, or a rotation of a support 4 of the laser scanner about a base 5 of the laser scanner 1, and a fast (horizontal) axis of rotation—also referred to as the beam axis of rotation 6—with respect to a fast rotating beam deflection element 7, mounted in the support 4 of the laser scanner 1.

For a sensing of linear or linearly movable structures and environments, such as, for example, railway track systems, roads, tunnels systems or air fields, a base or azimuth rotational axis is often dispensed with and instead, the laser scanner is mounted on a means of locomotion, such as a land-based or airborne carrier vehicle. Such laser scanners with just one beam axis of rotation 6 are also called profilers.

In particular profilers, but also two-axis laser scanners for a contiguous measurement of a large area, often also have a position and orientation system, which is, for example, directly integrated in the laser scanner to automatically reference local sensing data with a global 3D coordinate system.

The laser scanner 1 here also has a camera 8, for example, for recording RGB data, wherein the camera images of the environment can be associated with the sensing data generated by means of the rotating distance measurement beam 9 and associated angle encoder data for the direction of the distance measurement beam 9. The camera can in particular be individually movable, in order, for example, to record different fields of view and/or to orient the camera images and the scanning data with respect to a common reference surface or a common coordinate system.

Figure 2:
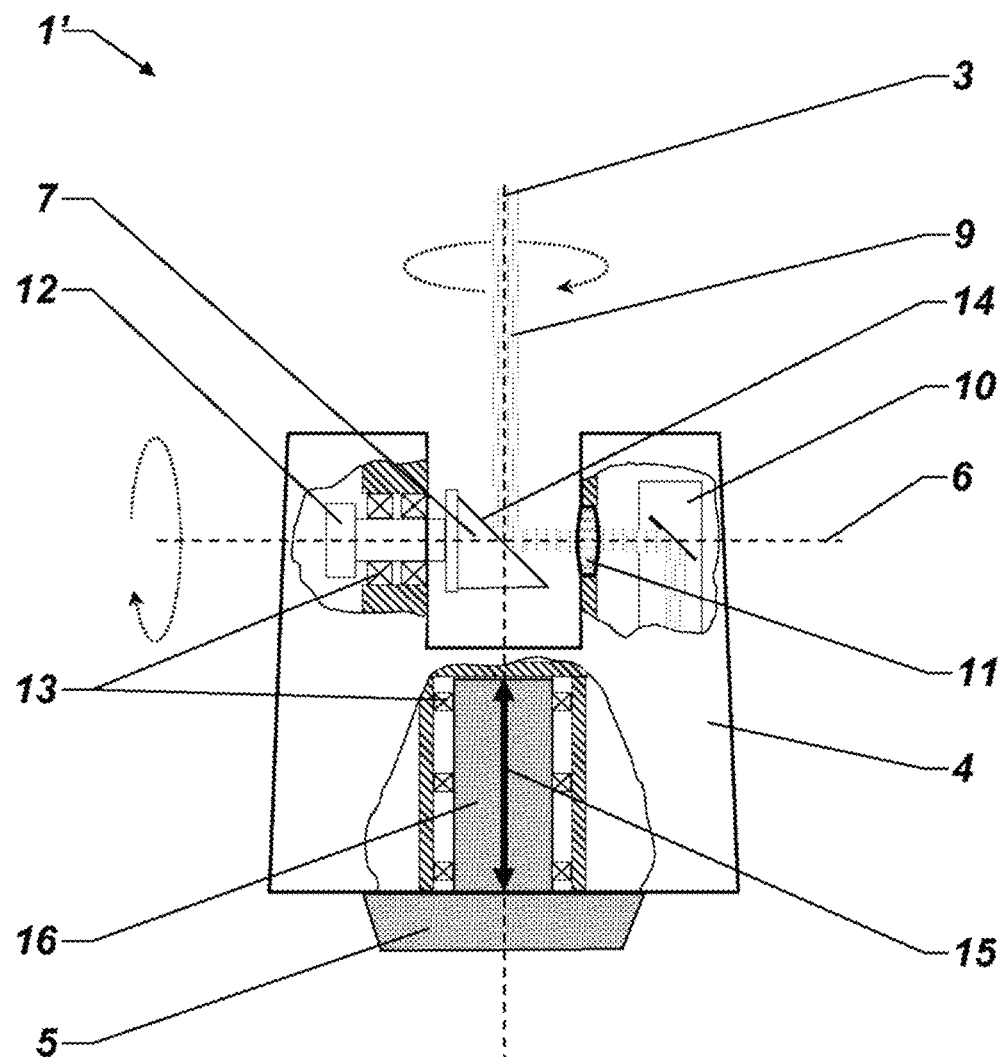
FIG. 2: typical equipment components for scanning using a commonly available laser scanner.

FIG. 2 shows typical principal components of a common laser scanner 1', here for example with two axes of rotation, wherein the laser scanner 1' is based on a design using a base 5 and a support 4, wherein the support 5 is rotatably mounted 13 on the base 5 about a support axis of rotation 3, in particular a slow rotation axis. Often, the rotation of the support 4 about the support axis of rotation 3 is also called azimuthal rotation, regardless of whether the laser scanner 1', or the support axis of rotation 3, is exactly vertically aligned.

The core component of the laser scanner 1' is formed by an optical distance measuring device 10 arranged in the support 4 for recording distance measurement data, with a transmitter unit for emitting a distance measurement radiation 9, for example pulsed laser radiation, and a receiver unit with a receiver optics, in particular a lens 11, and a light-sensitive sensor for receiving returning parts of the distance measurement radiation 9, wherein an echo is received from a back-scattering surface point of the environment and, for example, based on the propagation time, the shape and/or the phase of the pulse, a distance to the surface point is derived.

A scanning of the environment is carried out by a variation of the orientation of the emission direction of the distance measurement beam 9 by means of a rotating beam steering unit 7 for the distance measurement radiation, which is mounted 13 in the support 4 such that it can rotate about a beam axis of rotation 6, in particular a fast rotation axis, substantially orthogonal to the support axis of rotation 3. Using angle encoders 12 for detecting angle data, for example fixed angle angular positions and/or relative angular changes with respect to a rotation of the support 4 about the support axis of rotation 3 and angle data with respect to a rotation of the beam steering unit 7 about the beam axis of rotation 6, the emission direction of the distance measurement beam 9 is detected and associated with correspondingly acquired distance measurement data. By using a plurality of such measurement points essentially the entire environment can therefore be spatially measured, wherein, for example, a desired point-to-point resolution is set by adjusting the pulse rate of the distance measurement beam 9 and/or by adjusting the rotational speed of the beam steering unit 7. A subsequent display of the data can be based, for example, on common data processing steps and/or display methods, for example, for displaying the acquired data in the form of a 3D point cloud.

The beam steering unit 7 has a mirrored surface 14 for a deflection of the distance measurement radiation 9, in particular, a mirrored surface which is tilted with respect to the beam axis of rotation 6, such as a plane or parabolic mirrored surface, which on account of the fast rotation of the beam steering unit 7 and the resulting large centrifugal forces is typically designed to be integral with the rotating body of the beam steering unit 7, or less commonly by attaching a separate optical component such as a separate mirror.

A defined scanning motion of the distance measurement beam 9 with a minimal tolerance for the guidance of the distance measurement beam 9 with a high angular accuracy typically requires a mounting 13 of the support 4 and the beam steering unit 7 with the minimum possible amount of play, that is to say, with a minimum tolerance for a tilting of the support 4 with respect to the support axis of rotation 3, respectively for a tilting of the beam steering unit 7 with respect to the beam axis of rotation 6. In addition, the mirrored surface 14 typically has a high surface accuracy to ensure, for example, an optimal beam collimation and intensity sensitivity.

To ensure a zero-play mounting 13 with a minimum tilting of the beam steering unit 7 and the support 4, the mounting 13 is typically implemented in each case along an effective stabilization region 15 with a maximum axial extent. Due to the weight of the support 4, in the prior art the mounting 13 of support 4 about the support axis of rotation 3 is typically based on designing a vertical axis 16 to be as long (or high) as possible relative to the total volume of the support 4, which in combination with the mounting 13 of the support 4 defines a stabilization region 15 with a maximum axial extent.

Figure 3:
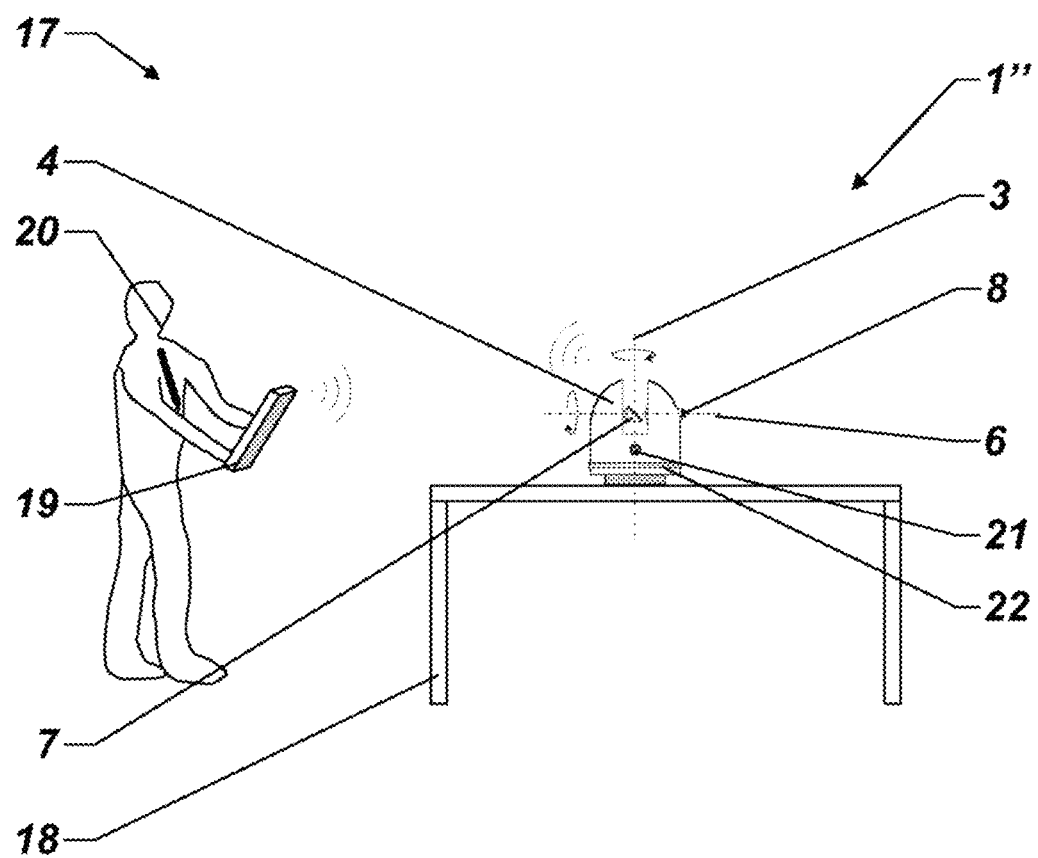
FIG. 3: a system according to the invention for optical measurement with a laser scanner and a (wireless) monitoring, processing and display unit.

FIG. 3 shows an inventive system 17 for optical measurement and for imaging an environment, here for example in the area of interior room measurement, wherein a laser scanner 1", for example to minimize possible shadowing and/or dead angles, can be placed anywhere in the room, here on a table 18 in the room. The system 17 comprises the laser scanner 1" for detecting measurement data, i.e. distance measurement data and angle data, provided by a distance measuring unit and angle encoders for determining the emission direction of the distance measurement beam. The measurement data also comprise surface sensor data, provided by a sensor arranged on the support 4 and co-rotating with the support 4, for example a camera 8, in particular an RGB camera or an infrared camera.

The measurement data is recorded by the laser scanner 1" as part of a measurement process, defined by a scanning sensing using the distance measuring device with a defined continuous rotation of the support 4 about the support axis of rotation 3, a defined continuous rotation of the beam steering unit 7 about the beam axis of rotation 6 and a continuous emission of the distance measurement radiation and a continuous reception of returning parts of the distance measurement radiation, as well as a repeated reading of the surface sensor 8 with respect to different azimuthal viewing directions of the sensor 8.

The inventive system 17 also comprises a processing unit, arranged on a separate computing device 19 from the laser scanner 1", in particular a computer or tablet, for processing parts of the measurement data with respect to an association of the surface sensor data with the distance measurement data and the angle data, wherein the inventive system 17 is designed in such a way that already during the data acquisition of the measurement data as part of the measurement process, at least an initial processing of portions of the measurement data is carried out in relation to an association of the surface sensor data with the distance measurement data and the angle data, in particular with the minimum possible delay, in other words substantially temporally in parallel with the data recording, and is continuously displayed for a user 20, for example as a continuously growing colored 3D point cloud, for example by means of a display coupled to or integrated with the computing device 19. In particular, the laser scanner 1" and the computing device 19 are configured in such a way that the transfer of the measurement data from the laser scanner 1" to the computing device 19, which is carried out substantially parallel to the measurement process by means of a data streaming which is started simultaneously with respect to the measurement process, for example using a WLAN or Bluetooth connection. In particular, the laser scanner 1" and the computing device 19 are configured in such a way that monitoring and control signals are transferred from the computing device 19 to the laser scanner 1" and therefore the laser scanner 1" is monitored by the external processing unit 19 and, for example, a defined measurement process of the laser scanner 1" can be started, stopped, interrupted and/or adjusted from the computing device 19.

In laser scanners the scanning by means of the distance measuring device is central and in the state of the art, camera data are therefore typically only recorded after a complete room scan (360 degrees of azimuth rotation) by the distance measuring device, for example, as supplementary information and often only for selected regions of the environment, for example to provide an improved display of a region of interest for a user.

Distance measurement modules used in laser scanners for spatial measurement typically have no color sensitivity, which means the 3D point cloud generated can be displayed in grayscale levels without the need to use additional data. As a result of the lack of color effect and the lack of depth effect supported by the presence of colors, many details remain hidden to a human observer. Using RGB data from a color camera, for example, a "colored" 3D point cloud can be generated, which, for example, makes its display to the human eye considerably easier. Such a referencing of different data and data sets is nowadays carried out, for example, using common data processing algorithms in an increasingly standardized manner.

In the prior art laser scanners are often designed in such a way that the field of view of a camera, for example an RGB camera, essentially records a scanning plane of the distance measurement radiation defined by a virtual 360-degree rotation of the beam steering unit about the beam axis of rotation, for example by means of parallel alignment of the optical axis of the camera with respect to the scanning plane or using appropriate coaxial coupling of the beam path of the camera into the beam path of the distance measuring device. This has the advantage, for example, that at least for the viewing range of the camera, directly corresponding camera and distance measurement data can be recorded. This allows, for example, a simultaneous recording of the camera data with the distance measurement data corresponding to the camera field of view, which can facilitate the referencing of the camera data with the distance measurement data. Thus, for example, any interference effects in the environment that occur during the measurement process can then be identified both in the camera data and in the distance measurement data.

Such an integration and alignment of the camera field of view, however, is often associated with a certain level of integration effort and in particular in the case of a highly compact construction of the laser scanner is only possible to a limited extent.

One aspect of the invention relates to an integration of the surface sensor 8, and in particular an RGB camera, in the laser Scanner 1", so that the viewing direction of the surface sensor differs significantly from the scanning plane, wherein, for example, a virtual backward extension of the optical axis of the surface sensor intersects with the scanning plane under a cutting angle of at least degrees, in particular under an angle of 90 degrees, in particular wherein the scanning plane is not captured by the field of view of the surface sensor.

This arrangement of the camera 8 in the laser scanner allows, for example, a compact design of the laser scanner 1" but has the disadvantage that a simultaneous recording of the camera data with distance measurement data corresponding to the camera field of view may not be possible. The inventive arrangement, by contrast, enables a parallel reading of the surface sensor 8, for example the RGB camera, with the scanning with the distance measuring device, which means, for example, a full-dome measurement can be carried out by the scanning distance measuring device and the camera 8 in one action, is thus accelerated, wherein, for example, the distance measurement data, the angle data and the camera data then can be computationally referenced with respect to one another accordingly.

A complete room scan (360 degrees azimuthal rotation) by means of the distance measuring device takes a relatively long time compared with a 360-degree recording of the camera data. In order nevertheless to ensure a display of the environment started directly with the measurement process, in particular as a colored 3D point cloud, one aspect of the invention relates to the fact that color camera data of the environment are recorded first, and the scanning by means of the distance measuring device is only carried out afterwards. An at least initial processing is thus carried out already based on the relatively quickly recorded camera data, which are displayed to a user 20, for example as a 2D panoramic view; and an association of the distance measurement data and the angle data with the recorded camera data can be carried out virtually in real-time with the acquisition of the distance measurement data, allowing a steadily growing colored 3D point cloud to be displayed to the user 20 substantially in real-time. This allows, for example, a rapid assessment of the recorded data by the user 20 and, if necessary, an immediate adjustment or change to the settings of the laser scanner 1", for example, a defined measuring mode with a different point density.

Since the laser scanner 1" in the context of the system according to the invention can be controlled by means of an external computer unit 19, in particular a tablet wirelessly connected to the laser scanner 1", which, in particular, also performs the computationally intensive association of the distance measurement data with the camera data and the angle data as well as the display of the measurement data, the laser scanner 1" may designed to be very compact.

In particular, the laser scanner 1" itself requires only a minimal number of control elements integrated in the laser scanner 1". For example, a laser scanner 1" according to the invention has only a single integrated control element 21, which has an active and an inactive state, and can be switched by way of an external action in order to occupy the active or inactive state. The two states, respectively, a change of the state of the control element 21 from the inactive to the active state, a change of the state of the control element 21 from the active to the inactive state, a switching of the control element 21 by means of a persistent external action during a defined time interval (e.g., continued pressing of a control knob), a coded sequence of state changes of the control element 21 between the active and inactive state and/or a coded sequence of temporally continuing external actions on the control element 21 over defined periods of time, are assigned, for example, individual measurement programs and/or actions of the laser scanner 1", for example, activation/deactivation of the laser scanner 1", starting a defined measurement process, or interruption/aborting/restarting a measurement process.

For example, the laser scanner 1" can also be designed with a position and orientation system, for example using an inertial system, tilt sensors or a receiver for a global satellite navigation system, which is transferred into an active state by the control element 21, whereupon the position and/or orientation of the laser scanner 1" are determined continuously and stored in the measurement data continuously. In this mode, the laser scanner 1" can then be moved within the room and, for example, local scanning data can be automatically referenced with a global 3D coordinate system.

The laser scanner 1" may also be designed in such a way that defined measurement programs and actions are stored on the laser scanner 1" and/or that new measurement programs and actions, for example, via a corresponding input functionality of the external computing device 19, can be defined and assigned to the states/state changes of the control element 21.

A further aspect of the invention relates to a status indicator 22 for indicating a device status, for example, indicating a status of a current measurement process, wherein the status indicator 22 is arranged on the support 4, in other words co-rotates about the support axis of rotation 3 during the rotation of the support 4. The status indicator 22 is then designed in such a way that it appears substantially identical around its circumference with respect to the support axis of rotation 3 in all azimuthal directions. For example, a user 20 of the laser scanner 1" regardless of their direction of view of the laser scanner 1" (seen from the scanner regardless of an azimuth angular position of the user 20) can be provided with the same information, in particular, even when a measurement process is running and the scanner 1" is rotating.

For example, the status indicator 22 is designed by means of a fiber-optic ring with two opposite located coupling inputs for light, wherein with increasing distance from the coupling position along the fiber-optic ring the ratio of radiation emission (radial light extraction) to transmission of light increases, wherein the device status is revealed to a user 20 by means of a visual coding, for example, a defined color coding of the status indicator 22 and/or by means of a defined flash coding of the status indicator 22.

Figure 4:
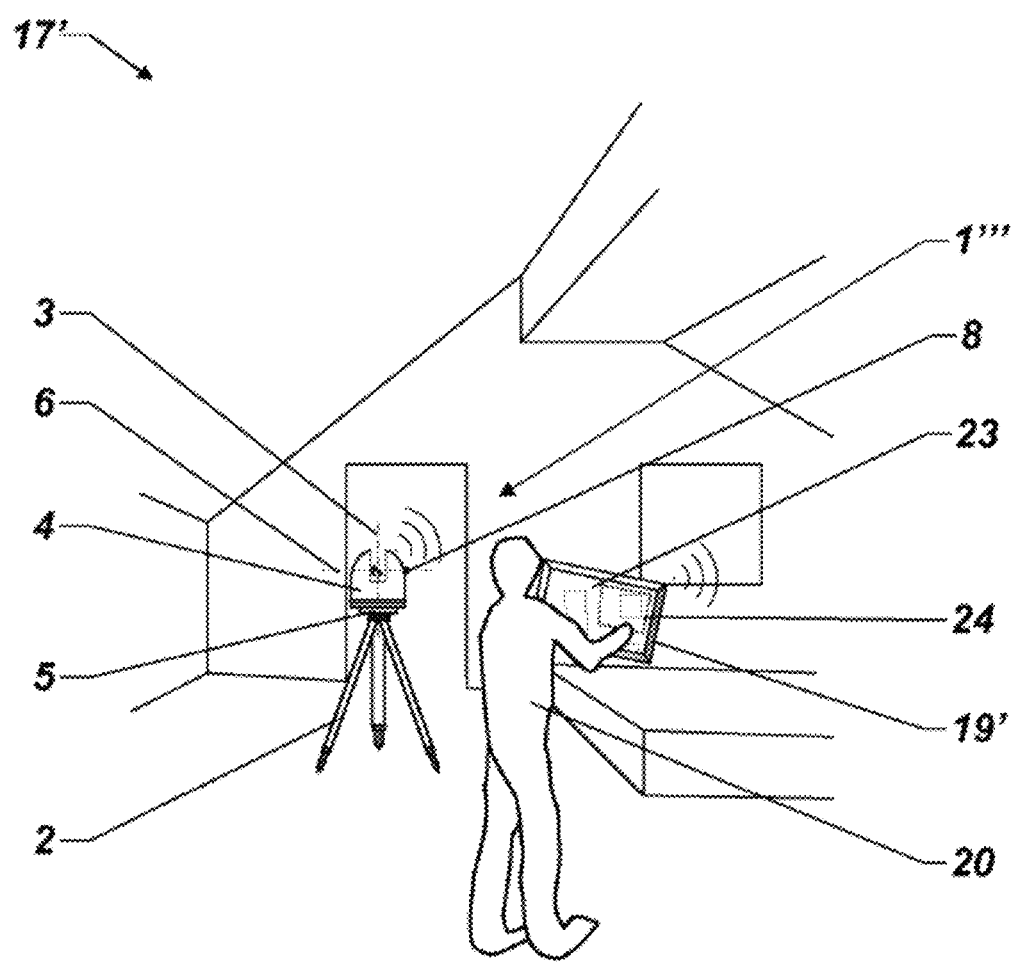
FIG. 4: a further embodiment of a system according to the invention for optical measurement with a laser scanner and a (wireless) monitoring, processing and display unit.

FIG. 4 shows a further embodiment of an inventive system 17' for optical measurement and for imaging an environment, for example in the area of interior room measurement, wherein the laser scanner 1' is mounted on a tripod. As before (see FIG. 3), the laser scanner 1''' is wirelessly controlled via an external computing device 19', here, for example, by means of a tablet, wherein data as well as monitoring and control signals are transferred in both directions (laser scanner 1''' to tablet 19' and vice versa).

In this embodiment the tablet 19' is also equipped with an inertial measurement system and/or tilt sensors, so that the laser scanner 1''' can be controlled on the basis of a location (position, orientation) of the computing device 19', for example substantially synchronously with the change of position of the computing device 19'.

The tablet 19' also has a display 23 on which, for example, a current live stream from the camera 8 is displayed, so that for different azimuthal angles of the support 4 of the laser scanner 1''' a user can observer the environment from the point of view of the position and orientation of the laser scanner 1'''. This means, for example, it can be checked prior to the measurement whether the current position of the laser scanner 1''' in the room needs to be adjusted in order to avoid dead angles.

The user 20 can also, for example via the tablet 19', for example using a touch screen functionality, define different areas of interest 24 in the environment for various azimuth positions of the laser scanner 1''', and allocate to these areas of interest 24 settings defined prior to the measurement process for the recording of measurement data (e.g. camera resolution, distance measurement accuracy, scanning resolution) and/or defined settings for the display of parts of the processed measurement data (e.g. color setting, highlighting).

In addition, the tablet 19' (or the laser scanner 1''') can, for example, access data for an augmented reality, so that for example further details of the surrounding area, hidden to the human eye, are displayed to the user 20 from the point of view of the scanner 1''', such as electricity cables or water pipes concealed in the walls, mounting points, items of furniture, etc.

Figure 5:
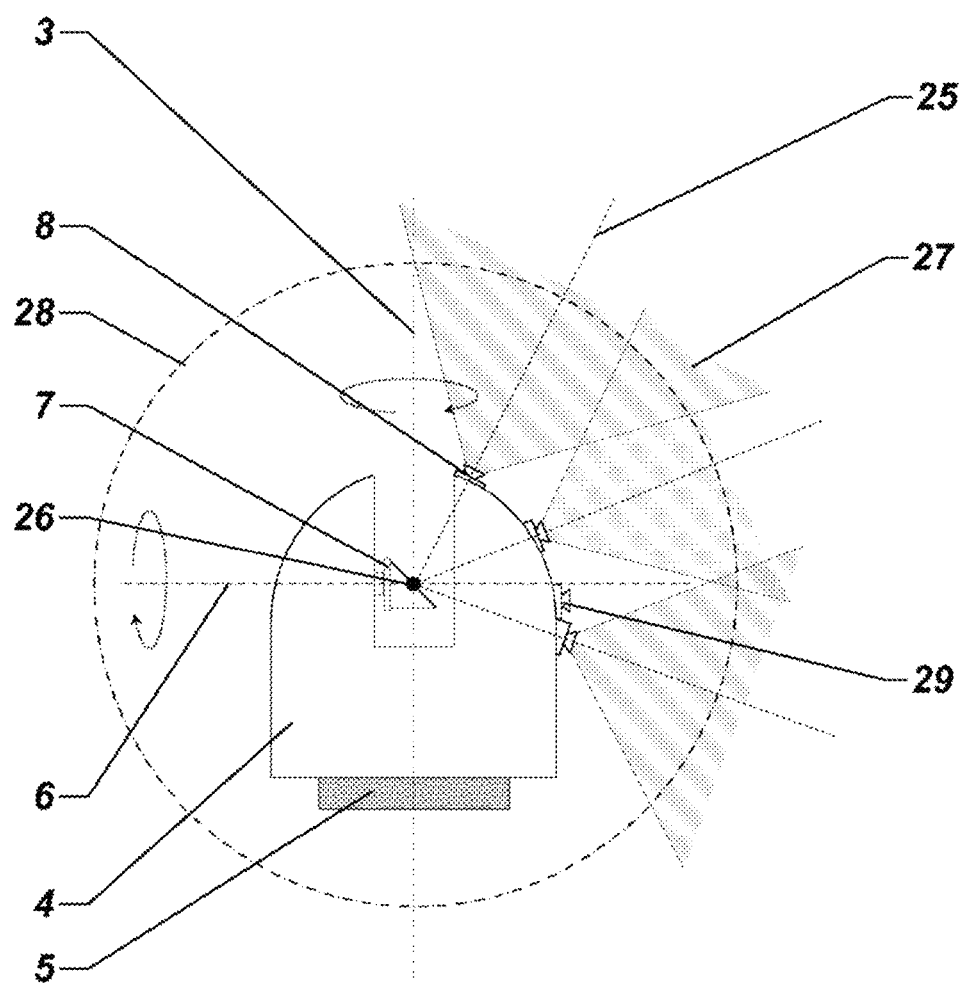
FIG. 5: a camera arrangement according to the invention of a plurality of cameras integrated in the laser scanner with respect to a central reference point.

FIG. 5 shows a laser scanner according to the invention with a plurality of cameras 8 integrated on the support, in particular wherein the cameras 8 are arranged in such a way that their optical axes 25 all lie in the same azimuthal plane—here, for example, perpendicular to the scanning plane of the distance measurement radiation defined by a virtual 360-degree rotation of the beam steering unit 7 about the beam axis of rotation 6—and the cameras 8 therefore have the same azimuthal viewing direction.

The laser scanner has a central reference point 26 as the origin for the distance and angle measurement of the distance measuring device, for example, the point of intersection of the optical axis of the lens with the beam steering unit 7. Alternatively, the distance measurement data can also be corrected by computation with respect to a central reference point defined elsewhere.

The cameras 8 are now arranged in accordance with the invention on the support 4 in such a way that a virtual backward extension of each of their optical axes 25 passes through the central reference point 26, the cameras 8 are thus arranged in a parallax-free manner with respect to the central reference point 26. This facilitates, for example, the referencing of the camera data with distance and angle data for displaying the measurement data as a 3D point cloud.

In addition, the parallax-free arrangement ensures that the optical axis 25 of the camera 8 is always substantially coaxial to an orientation (azimuth and elevation angle) of the distance measurement beam, namely, in the sense that during the measurement process (as part of the azimuthal rotation of the support 4) the camera 8 is sooner or later rotated into a past or future viewing direction of the distance measurement radiation, depending on whether the camera 8 is looking "ahead" or "backwards" with respect to the azimuth direction of rotation and the azimuthally rotating scanning plane of the distance measurement radiation. Due to the parallax-free arrangement the camera 8 thus "sees" the same view as the distance measurement radiation and is subject to substantially the same (generated by the environment) shadowing and field of view blockages as the distance measuring device, and so essentially captures the same sampling points as the distance measurement radiation. As a result, for example, corners and edges are detected substantially identically by the camera 8 and the distance measuring device, which, in turn, improves their referencing and/or modeling based on the camera and scanning data.

In the specific case the cameras 8 can be designed and positioned in such a way that they cover different elevational fields of view, for example, three cameras, wherein their visual field cones 27 intersect above a minimum radius 28 around the central reference point 26.

In particular if the camera with the steepest elevational alignment of the optical axis is designed such that its visual field cone 27 intersects the support axis of rotation 3, for example, at a distance of the above minimum radius 28 from the central reference point 26, the arrangement of the cameras from the minimum radius 28 and greater enables a full-dome measurement (measurement of the hemisphere defined by the support axis of rotation 3 and the beam axis of rotation 6 across the plane which is defined perpendicular to the support axis of rotation 3 and perpendicular to the beam axis of rotation 6).

Also shown in the figure is a camera 29 with parallax with respect to the central reference point 26, for example, an infrared camera for recording heat data.

Figure 6:
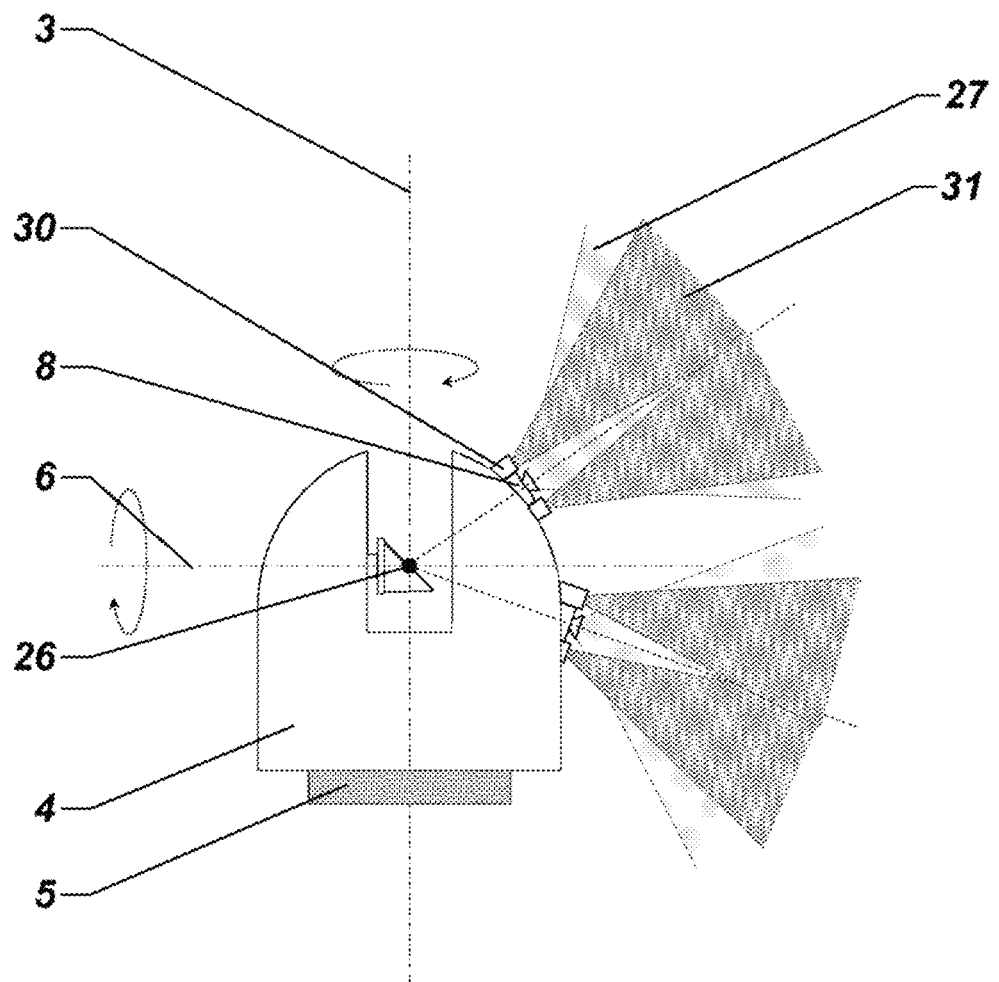
FIG. 6: a camera arrangement according to the invention with specific illumination means for individual camera viewing directions.

FIG. 6 shows another embodiment of a laser scanner according to the invention with parallax-free cameras 8 arranged in the support 4 with respect to a central reference point 26 of the laser scanner as the origin for the distance and angle measurement of the distance measuring device (see FIG. 5). The support 4 here additionally has a plurality of lamps 30, each illuminating the field of view of individual cameras, wherein the lamps 30 are designed and arranged in such a way that they are used for a selectively controllable illumination, substantially targeted at the field of view of a specific camera.

The lamps 30 are typically designed in such a way that the divergence of their light cone 31 is smaller than the field of view angle of the cameras, wherein each camera is assigned, for example, two or four lamps 30 arranged immediately at its side. The lamps 30 are implemented, for example, as LEDs to emit white light, or in each case as a dual LED, i.e. as LED couplets with two LEDs with distinct emitted spectral ranges, in order to achieve color representations of the camera images as realistic as possible to the human eye.

In order to achieve an optimal (individual) illumination of the individual cameras, for example, a 360-degree (azimuth rotation) preliminary scanning can be first carried out using the cameras, for example with lamps switched off or wherein the lamps are adjusted to a uniform intensity in order to derive optimized exposure times and illumination intensities for different azimuth positions for each of the individual cameras, which are then taken into account in an effective measurement scanning process.

Figure 7:
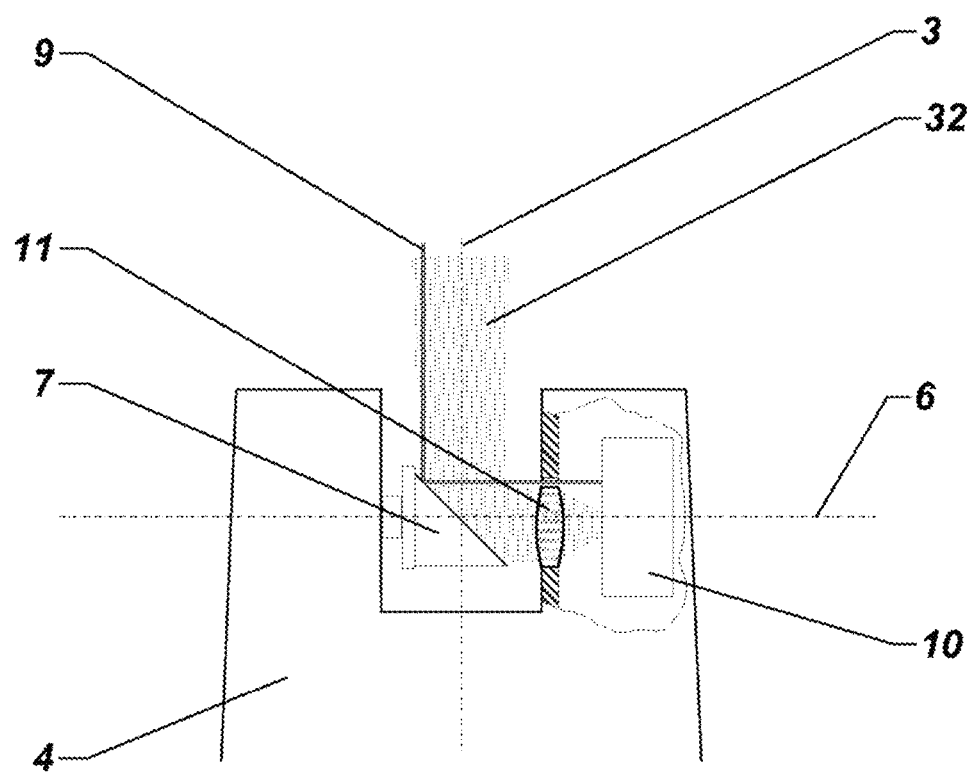
FIG. 7: a use according to the invention of the same rotating beam steering unit for the transmitted radiation and the received radiation by means of a biaxial arrangement of the beam outlet with respect to the optical axis of the lens unit.

FIG. 7 shows a further embodiment of a laser scanner according to the invention with a biaxial arrangement with respect to the outgoing distance measurement beam 9 and the optical axis of the lens 11 or the receiver of the distance measuring device 10, wherein the outgoing distance measurement beam 9 and the returning parts 32 of the distance measurement beam are deflected into the surroundings via the same optical rotating element 7, or into the lens 11 respectively. This enables, for example, a compact, simple and robust design of the distance measuring device 10. In the example shown the outgoing distance measurement radiation 9 is arranged in such a way that it exits directly next to the lens 11 of the receiving unit of the distance measuring device 10.

In contrast to the frequently used coaxial arrangement between distance measurement beam and lens no central shadowing occurs, caused for example by a deflection mirror arranged in the center of the lens for the distance measurement radiation. However, in particular for parts of the distance measurement radiation returning from a near field, a parallax effect does occur, caused by the lateral offset of the beam outlet with respect to the optical axis of the lens. As a result, a vertical wall for example is therefore scanned by the distance measurement beam with sinusoidal scanning sections instead of substantially vertical scanning sections.

However, on the one hand this effect can be compensated with a suitable corrective optics in the lens 11, for example a cylindrical lens, and/or on the other hand, compensated computationally using a compensation algorithm as part of a referencing of the measurement data with respect to a common coordinate system, based on the angular position of the beam steering unit 7 and the distance detected stored at the time of recording the distance measurement radiation.

Figure 8:
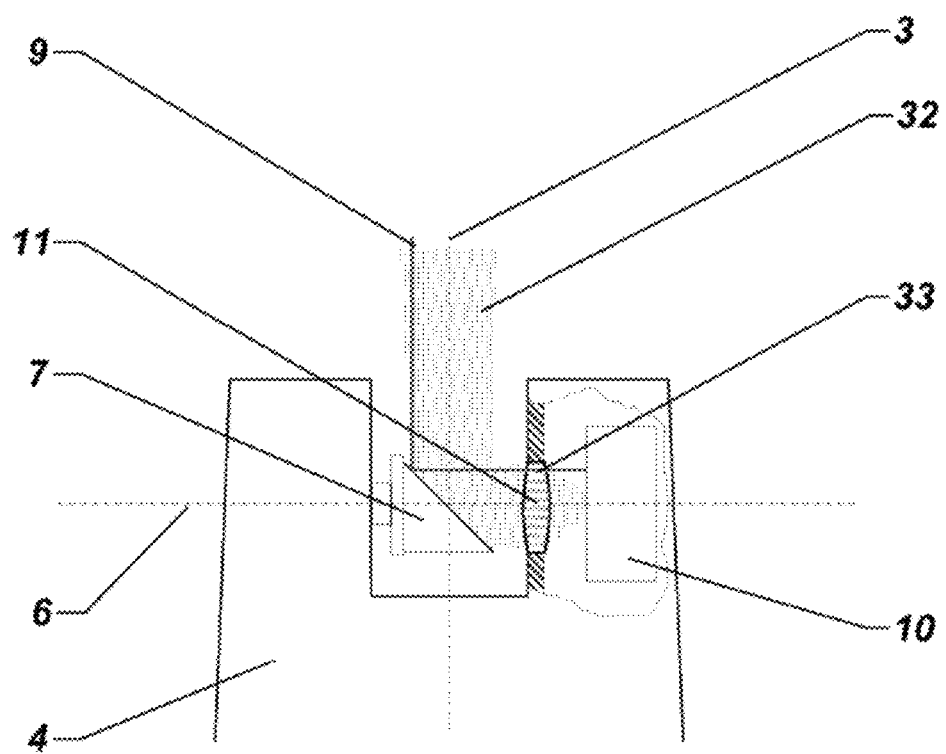
FIG. 8: a further use according to the invention of the same rotating beam steering unit for the transmitted radiation and the received radiation by means of a window integrated in the lens unit for the transmitted beam.

FIG. 8 shows a further embodiment of a laser scanner according to the invention with a biaxial arrangement with respect to the outgoing distance measurement beam 9 and the optical axis of the lens 11 or the receiver of the distance measuring device 10, wherein here the distance measurement radiation 9 exits through an outlet area 33 arranged in the lens 11, for example through a cutout portion or a window in the lens 11. This will reduce, on the one hand, the parallax effect caused by the lateral offset between the outgoing distance measurement beam 9 and the optical axis of the receiver unit and, on the other hand, the effective light collection area is better exploited by the beam steering unit 7 and the lens 11.

Figure 9:
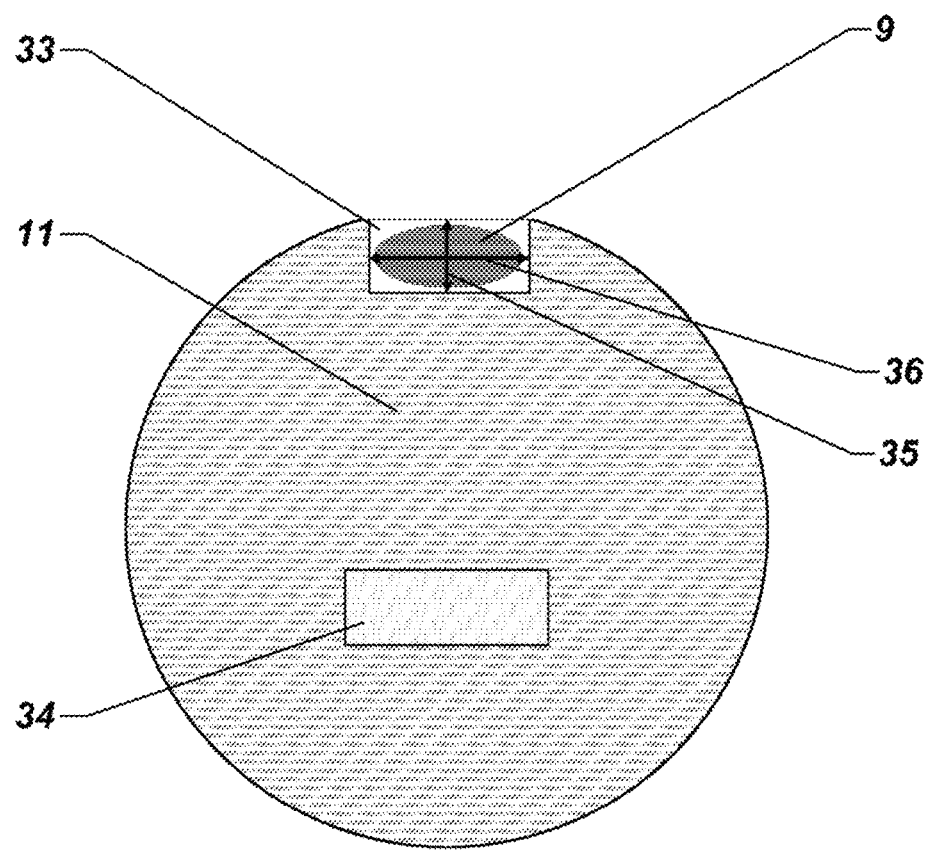
FIG. 9: a lens unit according to the invention with a window integrated in the lens unit for the transmitted beam and with a corrective optics for measurement in the near range.

FIG. 9 shows a front view of a lens unit 11 for an inventive biaxial arrangement with respect to the outgoing distance measurement beam 9 and the optical axis of the lens 11 of the distance measuring device, wherein the distance measurement radiation 9 exits through an outlet region 33 arranged in the lens 11 (see FIG. 8), here, for example arranged directly radially at the edge of the lens 11. In addition, a corrective optics 34 for compensating the parallax effect for parts of the distance measurement radiation returning from a near-range of the distance measurement radiation 9.

The outlet region 33 is typically dimensioned and oriented such that the geometry of the outlet region 33 substantially only just covers the minimum 35 and the maximum 36 extension of the beam waist of the outgoing distance measurement radiation 9—for example, depending on the geometry, arrangement and orientation of a diode generating the distance measurement radiation 9, in particular wherein the geometry and orientation of the outlet region are adjusted with regard to the geometry and orientation of the beam cross section, for example in the form of an oval window.

Figure 10:
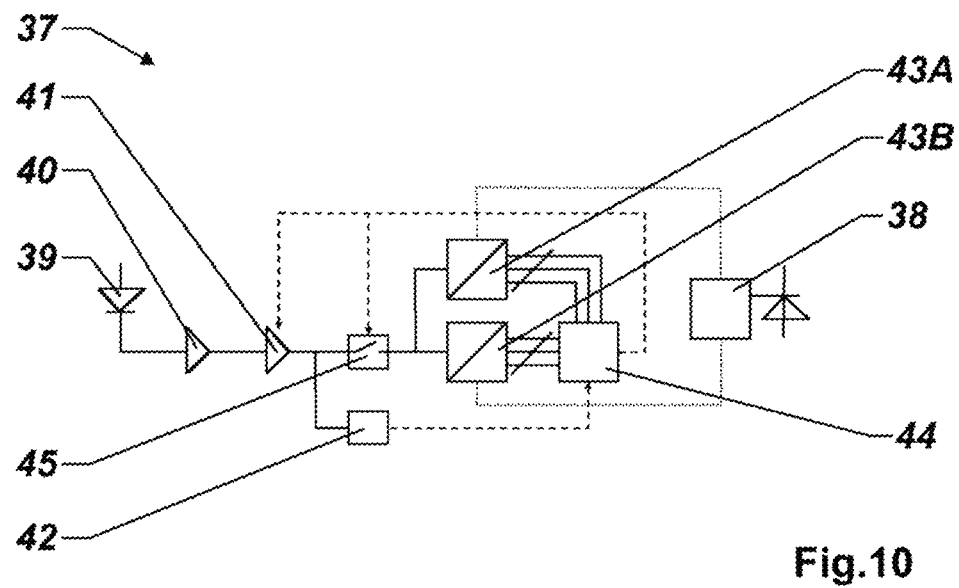
FIG. 10: a receiver circuit according to the invention with a comparator stage and two analog-to-digital conversion stages for adjusting a signal amplitude of a measuring signal and an increase in the measurement rate.

FIG. 10 shows a schematic drawing of a receiver circuit 37 according to the invention of a laser distance measuring module according to the invention, suitable for deriving a distance to a target object based on the signal propagation-time method, which here is coupled to a pulser 38.

For example, the receiver circuit 37 comprises a receiver element 39, such as a receiver diode, a transimpedance amplifier 40 and an amplifier unit 41 for adjusting a signal amplitude, in particular by means of amplification or attenuation of an input signal, for example by means of a Variable Gain Amplifier (VGA). The receiver circuit 37 also comprises a comparator stage 42 for deriving a signal amplitude of a detected received signal, here arranged after the amplifier unit 41, wherein the comparator stage 42 can also alternatively be arranged in front of the amplifier unit 41. The circuit 37 also has a first 43A and a second 43B analog-to-digital conversion stage, as well as a control unit 44, for example a microprocessor or an FPGA (Field Programmable Gate Array).

The comparator stage 42, the amplifier unit 41 and the first 43A and second 43B analog-to-digital conversion stage are arranged in such a way that a continuous sequence of distance measurements comprises a first distance measurement by means of the first analog-to-digital conversion stage 43A, for example based on a first signal packet of successive received signals, and a second distance measurement by means of the second analog-to-digital conversion stage 43B, for example, based on a second packet of successively received signals. This process involved an alternating use of the first 43A and second 43B analog-to-digital conversion stage, wherein a first received signal is used as a test signal and a second signal as a measurement signal. The test signal is fed to the comparator stage 42, by means of which a signal amplitude of the test signal is derived, wherein an adjustment of the amplifier unit 41 is carried out for at least parts of the received signals containing the measurement signal based on the derived signal amplitude of the test signal, so that at least the measurement signal is present as an input signal in the control range of the analog-to-digital conversion stages 43A,B.

In the example shown, the receiver circuit 37 also has an activation unit 45, by means of which, for example, a setting is applied according to which the test signal is either additionally taken into account or discarded for the derivation of the distance to the target object. Specifically, the activation unit 45 can be configured in such a way that, for example, with appropriate storage of the detected received signals, a range of values for a usable signal amplitude of the test signal is defined and the signal amplitude of the sample signal derived by the comparator stage is compared with the range of values; wherein the activation unit 45 is controlled based on the comparison of the signal amplitude with the range of values, so that if the signal amplitude of the test signal is within the range of values, the test signal is taken into account for the derivation of the distance to the target object, and if the signal amplitude of the test signal is outside the value range, the test signal is discarded for the derivation of the distance to the target object.

Figure 11:
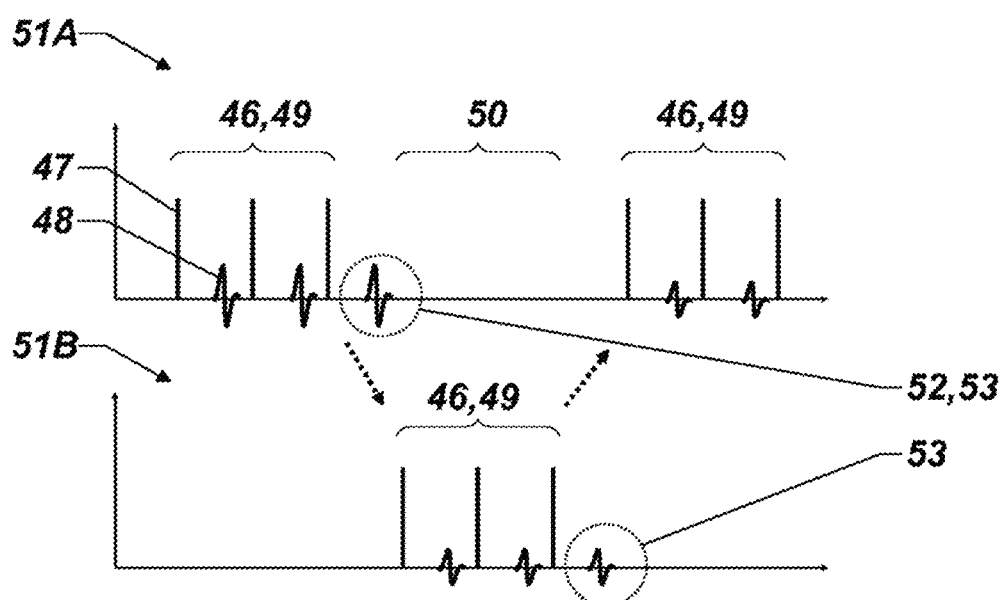
FIG. 11: example illustration of pulse packets and test and measurement signals as part of a receiver circuit according to the invention with two analog-to-digital conversion stages.

FIG. 11 shows an example drawing of pulse packets 46 of transmitted signals 47 and received signals 48 used as test and measurement signals within a receiver circuit 37 according to the invention (see FIG. 10) with two analog-to-digital conversion stages 43A,B (see FIG. 10), wherein each analog-to-digital conversion stage has a sampling phase 49 for receiving an incoming signal and an output phase 50 for an evaluation of the incoming signal, wherein as part of the alternating use of the first 51A and second 51B analog-to-digital conversion stage the output phase 50 of the first analog-to-digital conversion stage takes place simultaneously or almost simultaneously with the sampling phase 49 of the second analog-to-digital conversion stage, and the output phase 50 of the second analog-to-digital conversion stage takes place simultaneously or almost simultaneously with the sampling phase 49 of the first analog-to-digital conversion stage.

This means that, for example, as part of a single distance measurement by the second analog-to-digital conversion stage, a received signal 52 of a received packet of an immediately preceding distance measurement can be used by the first analog-to-digital conversion stage as the current test signal 53 for the distance measurement of the second analog-to-digital conversion stage (and vice versa). As a result, a suitable input signal in the control range of the analog-to-digital conversion stages can be set after only a few iterations, wherein the alternating use of the analog-to-digital conversion stages allows high distance measurement rates to be achieved.

Figure 12:
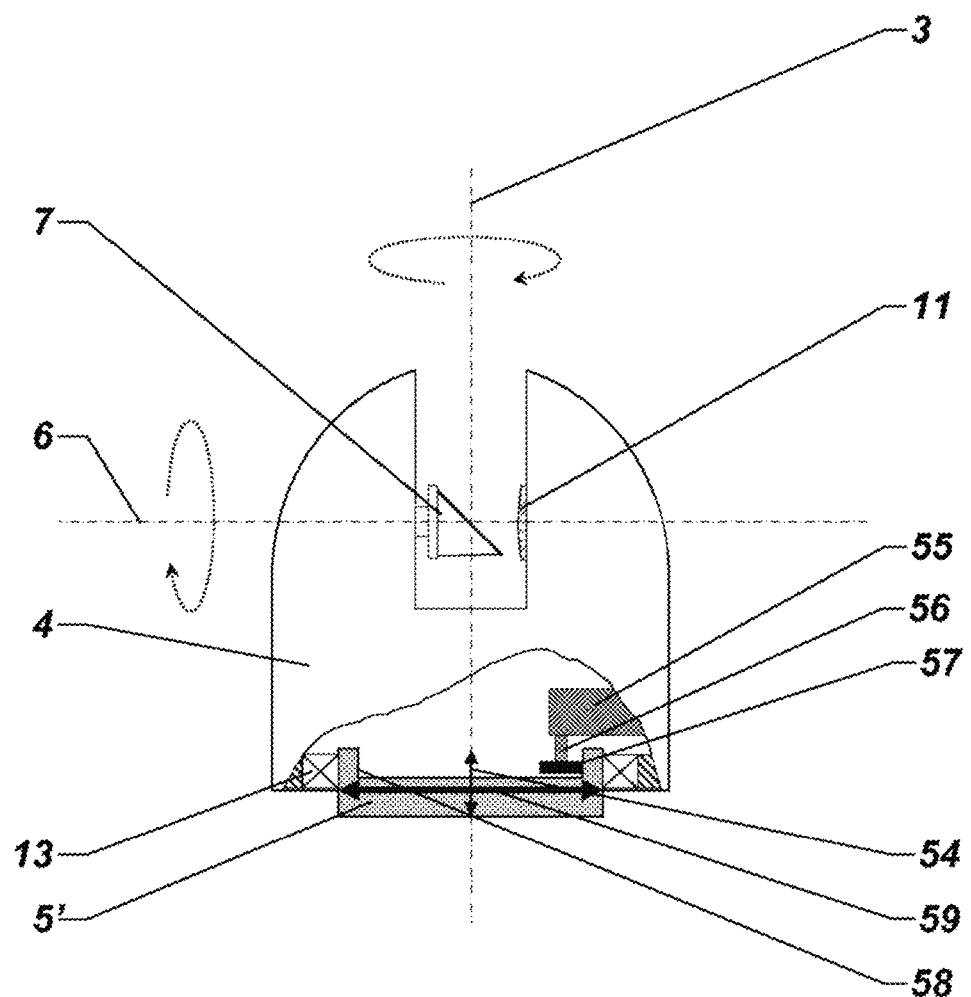
FIG. 12: an arrangement according to the invention of a laser scanner with a passive base with regard to scanning and data acquisition, with a short vertical axis and an integration of the motor in the support for the rotation of the support.

FIG. 12 shows a laser scanner according to the invention with a "passive" base 5' with regard to scanning and data acquisition, here with a short axial vertical axis 54 compared to the radial extent and with the motor 55 for the rotation of the support 4 integrated in the support 4.

The base 5' is passive to the extent that all active electronics required for the motorization of the rotation around the support axis of rotation 3—for example, for a direct drive, piezoelectric drive or friction-wheel drive—is arranged exclusively in the support 4 and co-rotates with the support 4 about the support axis of rotation 3, wherein, for example, an active drive element 55 for the rotation of the support 4 about the support axis of rotation 3, here a rotary motor with a drive shaft 56 coupled to the motor, and a power supply unit for the active drive element 55 are each arranged entirely in the support 4.

In the example shown, the drive for the rotation of the support 4 about the support axis of rotation 3 is designed as a friction wheel drive, wherein a drive shaft 56 of a rotary motor 55 extends to the base 5' parallel to the support axis of rotation 3 with an offset relative to the support axis of rotation 3, wherein on the output section of the drive shaft 56, for example, an idle wheel 57 implemented with a rubber ring is arranged, which rolls off along a circular symmetric bearing surface 58 of the base 5'.

Due to the compact design, in particular the short axial vertical axis 54, here the radial extension 59 of the vertical axis is chosen as large as possible and the drive shaft 56, respectively the idle wheel 57, runs on a bearing surface 58 defined by the inside of a base ring. Alternatively, the drive can also be designed in such a way that the drive shaft 56 is arranged outside of a base ring, so that it rolls off on an outer side of the base ring of the base.

In a specific embodiment, the laser scanner has a total of only one power supply unit, namely the power supply unit for the active drive element 55, which is arranged in the support 4, wherein the base 5' is permanently and irreversibly electrically decoupled from the support 4 and no electrical power transmission takes place between the support 4 and the base 5'.

Figure 13A:
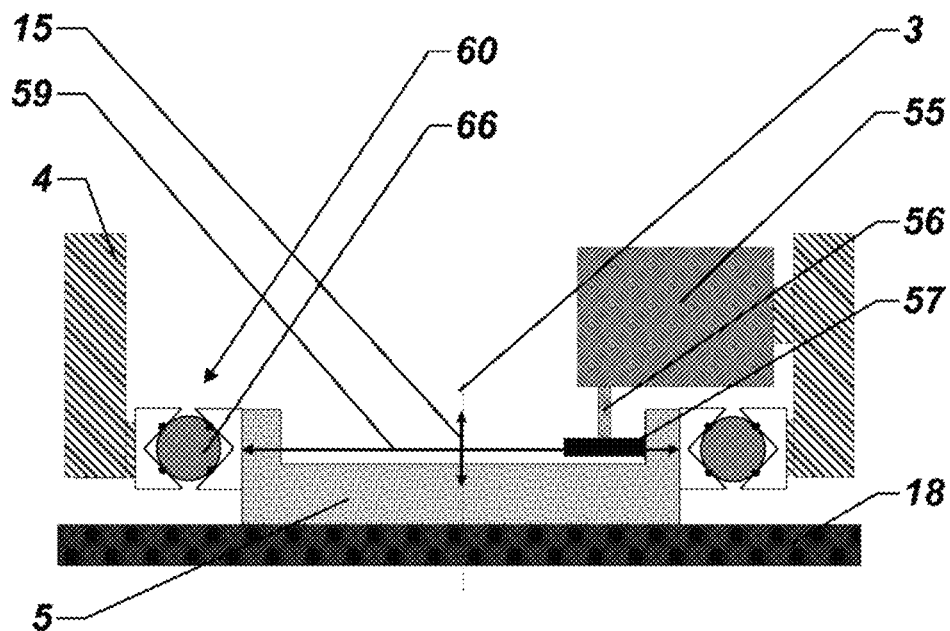
FIG. 13*a,b*: integration according to the invention of the motor for the rotation of the support in the support, and mounting according to the invention based on a short vertical axis by means of a four-point rolling bearing (a) or a sliding bearing (b)

The FIGS. 13a,b show two embodiments of a mounting according to the invention of an axially compact vertical axis, in other words of an axial vertical axis which is short compared to the radial extension 59. In each of the examples shown the laser scanner is placed, for example, on a table 18.

Due to the axially compact (short) design the vertical axis along the support axis of rotation 3 has exclusively one short overall effective stabilization region 15, by means of which a stabilization of the support 4 is obtained with respect to a tilting of the support 4 relative to the base 5, or the support axis of rotation 3. In order to prevent a tilting of the support 4 relative to the base 5 therefore, according to the invention the substantially radially symmetric extension 59 of the vertical axis, perpendicular to the support axis of rotation 3, is greater than its axial extension.

In accordance with one aspect of the invention, the support 4 is also mounted on the stabilization region 15 of the base 5 with a single bearing rim such that it can rotate about the support axis of rotation, the stabilization being obtained exclusively by the single bearing rim.

Figure 13B:
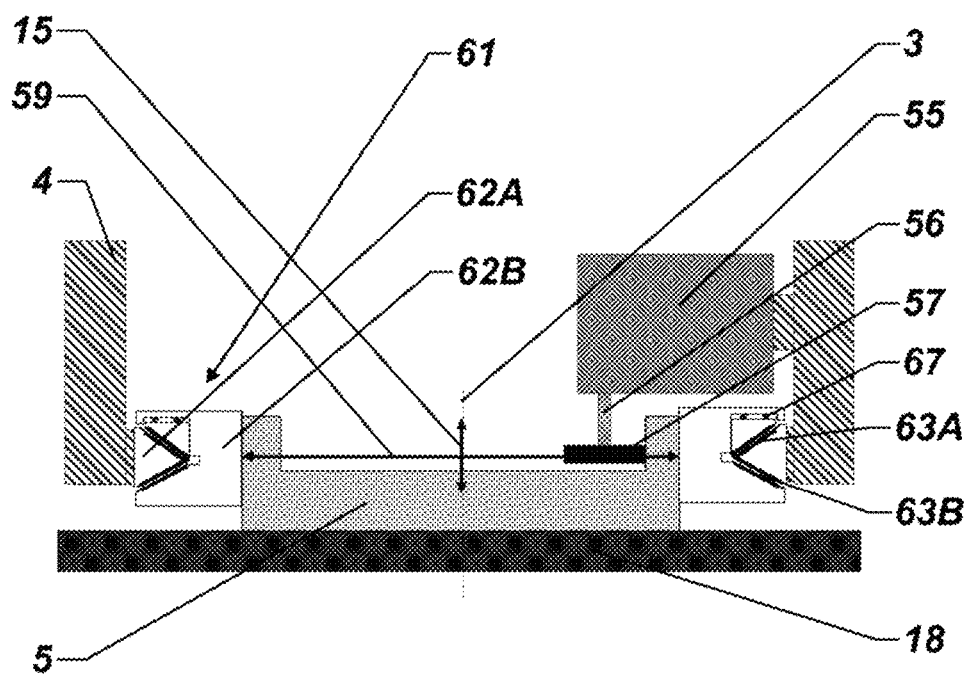

The bearing rim can be designed as a single-row four-point roller bearing 60 with a rolling body 66 (FIG. 13a) or as a single-row sliding bearing 61 with an outer 62A and inner ring 62B (FIG. 13b), wherein the outer ring with the inner ring forms two contact bearings 63A,B axially spaced apart with respect to the support axis of rotation 3. For example, one contact bearing 63A can be arranged elastically 67, to ensure sufficient play for the rotation around the support axis of rotation 3.

The stabilization can then be generated, for example, by means of a spring tension acting radially on the bearing rim with respect to the support axis of rotation 3.

A further aspect of the invention is aimed at ensuring that bearing lubricants cannot escape from the bearing into other parts of the laser scanner. This is important, for example, in a drive unit according to the invention designed as a rotary motor 55 with a drive shaft 56 offset with respect to the support axis of rotation 3 and with an idle wheel 57 implemented with a rubber ring (see description for FIG. 12) for the rotation of the support 4 about the support axis of rotation 3, because due to lubricants, for example, the adhesion of the idle wheel 57 on the base ring 58 is reduced (see FIG. 12).

On the one hand, this can be achieved by, for example, the mounting being implemented as a four-point roller bearing in the form of a dry-running ring bearing with ceramic roller elements.

On the other hand, for example, along a boundary region substantially parallel to a contact bearing a lubricant-repellent emulsion can be applied, so that any dispersion of a lubricant due to the surface tension of the lubricant-repellent emulsion is substantially limited by the boundary region.

Figure 14A:
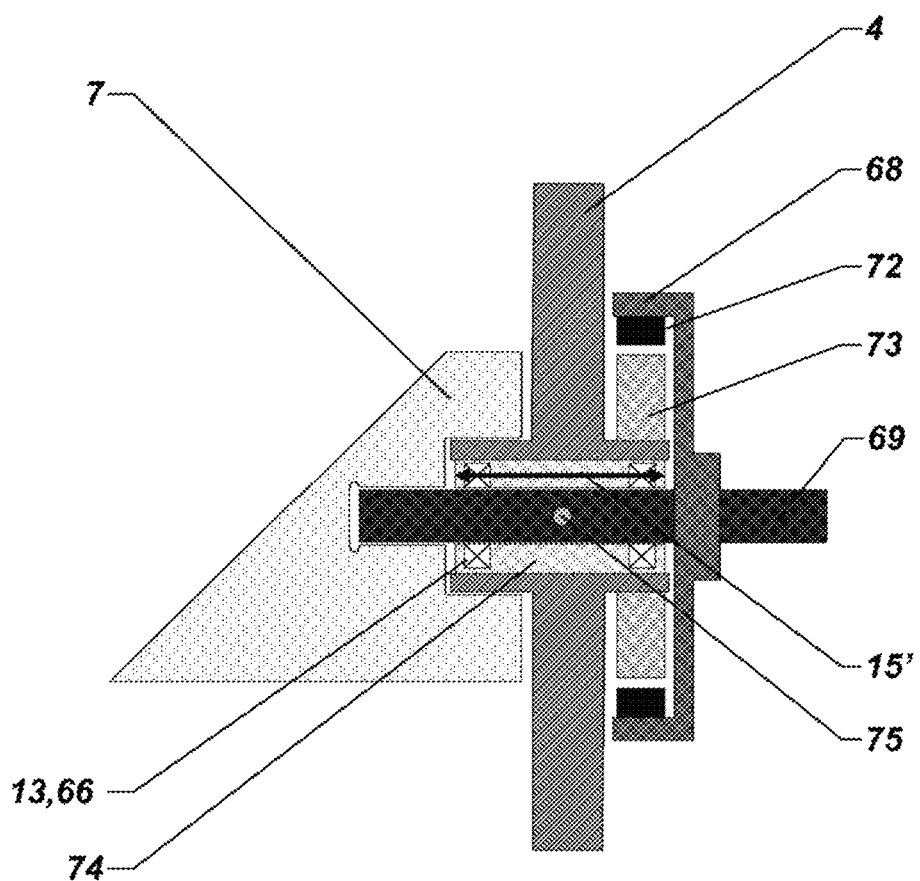
FIG. 14*a,b*: a mounting according to the invention and a compact drive according to the invention of the beam steering unit about the fast axis by means of a bell element.

FIGS. 14a,b show a mounting 13 according to the invention and a compact drive unit according to the invention of the beam steering unit 7 about the fast axis by means of a bell-shaped element 68.

Figure 14B:
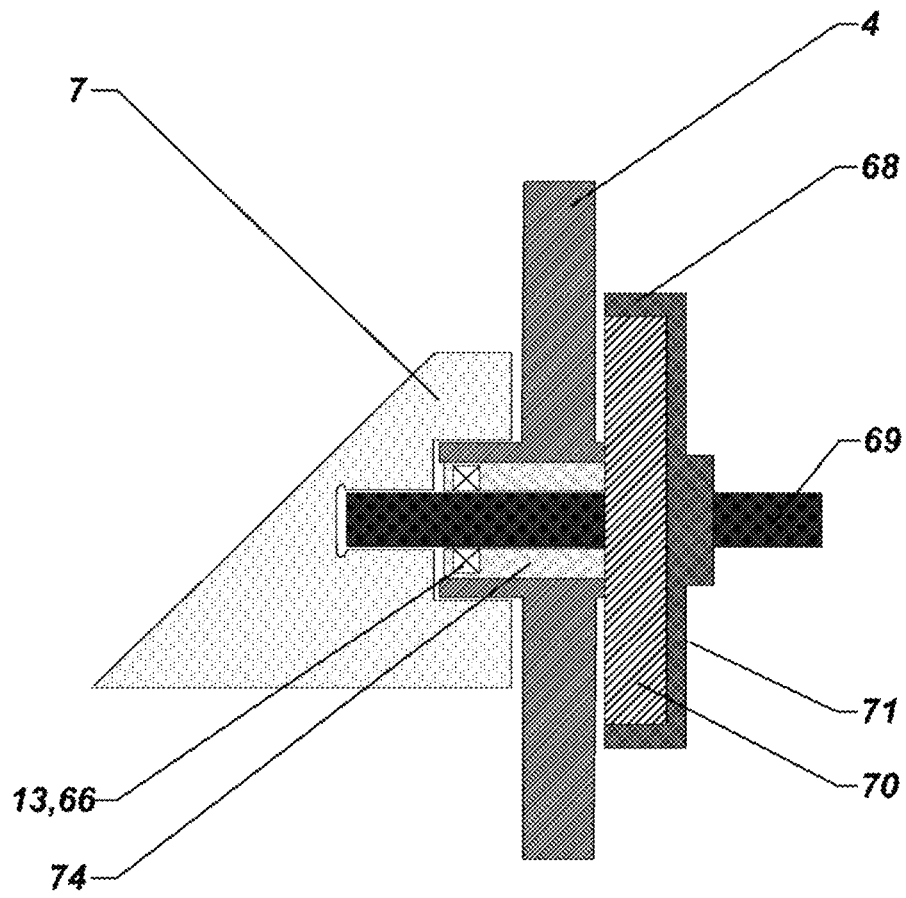

FIG. 14a shows the beam steering unit 7, which is connected to a shaft 69 mounted 13 in the support 4 along the beam axis of rotation, in particular wherein the shaft 69 penetrates into the beam steering unit 7 with a defined penetration depth or is designed integrally with the beam steering unit 7. The shaft 69 is also connected to a bell-shaped element 68, wherein the bell-shaped element 68 defines a bell-shaped body 70 and a bell-shaped back 71 (see FIG. 14b). In the bell-shaped body 70 a passive magnetic element 72 is arranged, which is connected to the bell-shaped element 68, and an active drive element 73 is arranged on the support 4 to generate an electromagnetic interaction with the passive magnetic element 72, for example an electrical coil element, wherein the active drive element 73 protrudes at least partly into the bell-shaped body 70, so that by a radial interaction between the active drive element 73 and the passive magnetic element 72 the beam steering unit 7 can be set into a defined rotational movement about the beam axis of rotation.

For a maximally compact design, for example the whole of the active drive element 73 and at least part of the mounting bush 74 for the mounting 13 of the shaft 69 in the support 4 are arranged in the bell-shaped body 70, in particular wherein the bearing is implemented as a roller bearing and rolling bodies 66 of the rolling bearing protrude at least partially into the bell-shaped body 70. In addition, a part of the mounting bush 74 can protrude into the beam steering unit 7, in particular wherein parts of the rolling bodies 66 of the roller bearing at least partially protrude into the beam steering unit 7.

A further aspect of the invention relates, for example, to the fact that the shaft 69 comprises only one single effective stabilization region 15' axially along the beam axis of rotation, which is used to stabilize the support against a tilting of the shaft 69 relative to the support 4, or to the beam axis of rotation, wherein the beam steering unit 7, the bell-shaped element 68 and the shaft 69 are designed and arranged with respect to each other (for example, including by means of balancing elements) in such a way that their common center of gravity 75 axially along the beam axis of rotation is located in the stabilization region 15', in particular wherein the stabilization is achieved exclusively by a bearing which substantially axially-symmetrically surrounds the center of gravity 75.

Figure 15:
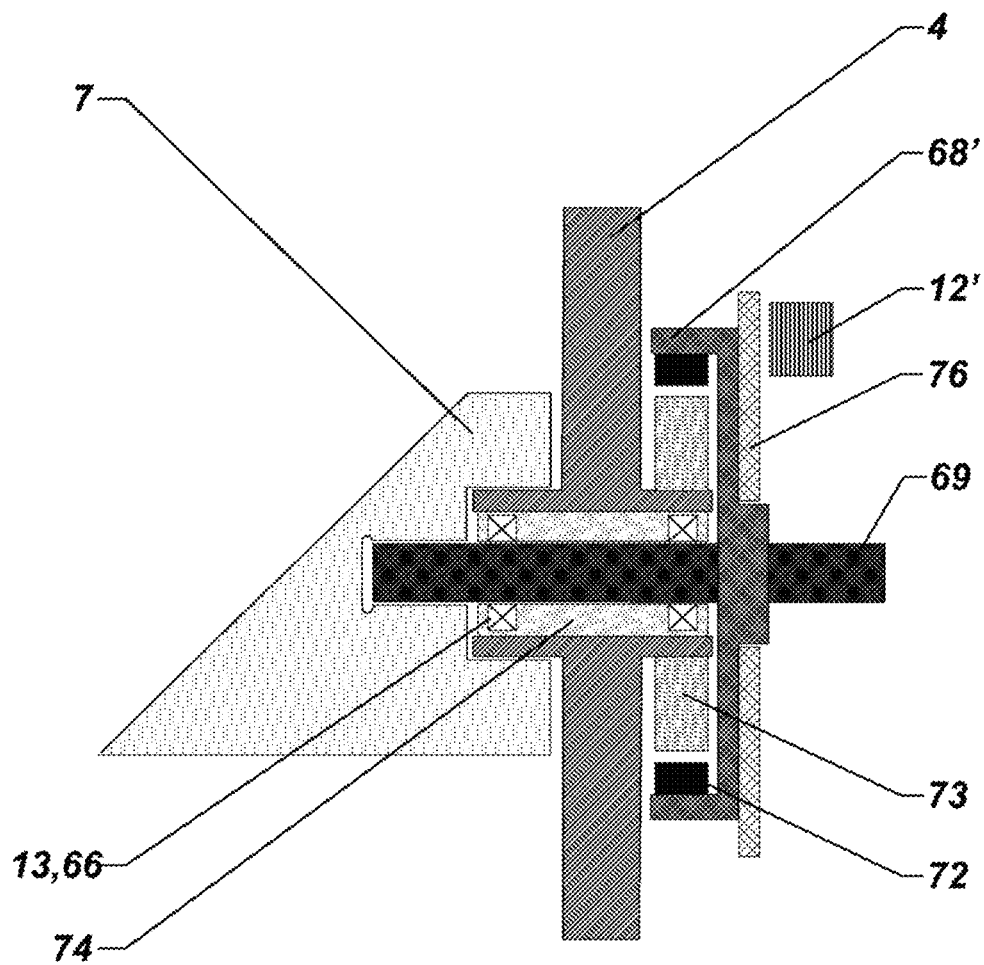
FIG. 15: a further embodiment according to the invention of the bell element with an encoder disc for an angle encoder integrated in the bell element.

FIG. 15 shows a further embodiment of the inventive bell element 68', wherein here an encoder disc 76 is arranged on the bell-shaped back, in particular integrated or forming a single piece with the bell-shaped element 68', for recording angle encoder data with respect to the rotation of the beam steering unit 7 about the beam axis of rotation by means of an angle encoder 12' arranged in the support 4.

Figure 16A:
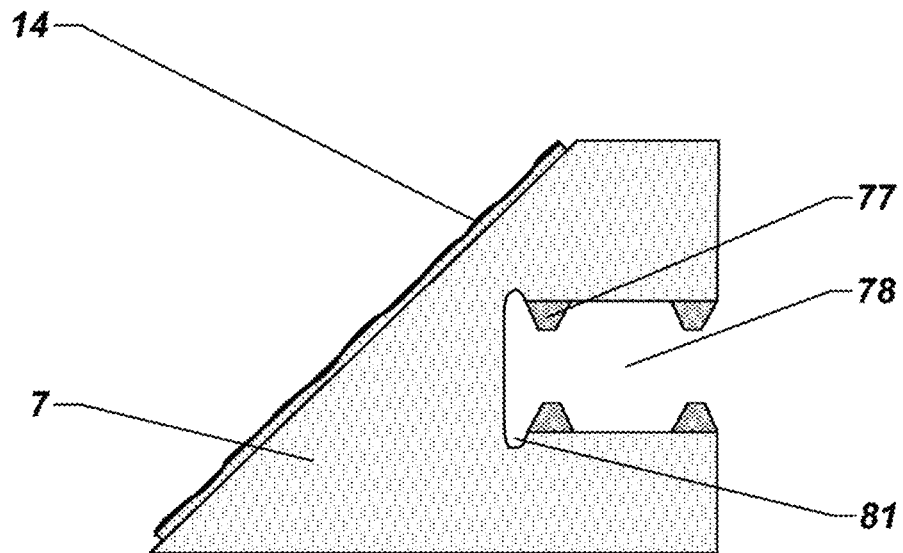
FIG. 16*a,b*: a coupling according to the invention of a beam steering unit to a shaft along the beam axis of rotation by means of compressible stabilization elements.

The FIGS. 16a,b show an inventive coupling of a beam steering unit 7 to the shaft 69 along the beam axis of rotation by means of compressible stabilization elements 77 in the coupled and uncoupled state.

FIG. 16a shows the uncoupled beam steering unit 7, which comprises a mirrored surface 14 for deflecting the distance measurement radiation, in particular a tilted mirrored surface with respect to the beam axis of rotation. Typically, on account of the high centrifugal forces induced by the rapid rotation of the beam steering unit 7, the mirrored surface 14 is implemented integrally with the beam steering unit.

Figure 16B:
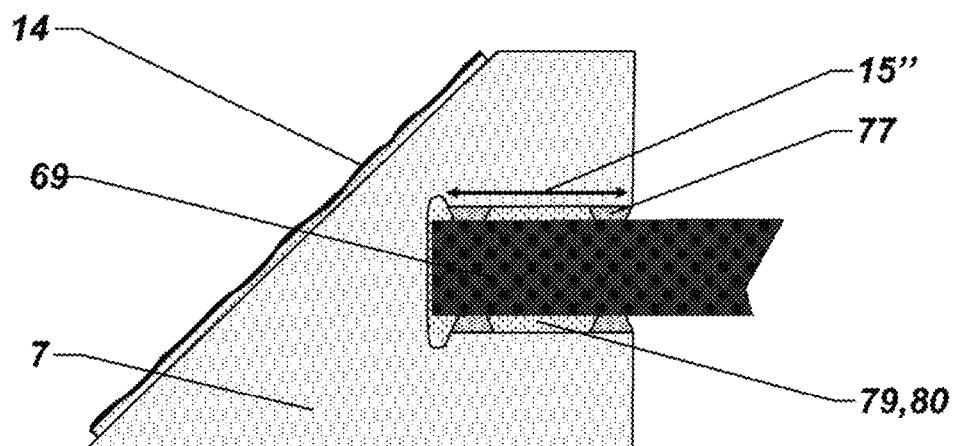

The beam steering unit 7 has an enclosure region 78 for a penetration of the shaft 69 during a coupling of the beam steering unit 7 to the shaft 69, so that in the coupled state between the shaft 69 and the enclosure region 78 of the beam steering unit 7 a gap 79 with a defined width is present (see FIG. 16b, which shows the beam steering unit 7 in the state where it is coupled to the shaft 69). The enclosure region 78 also has a stabilization element 77 that can be compressed in the gap 79 for tolerance compensation and for the stable connection of the beam steering unit 7 to the shaft 69, wherein in the uncoupled state the stabilization element 77 has a thickness that is greater than the width of the gap 79 and in the coupled state surrounds the shaft 69, for example in a continuous annular manner.

In accordance with one aspect of the invention, the beam steering unit 7, the shaft 69 and the stabilization element 77 are designed and interact in such a way that during the coupling of the beam steering unit 7 with the shaft 69 the stabilization element 77 arranged between the enclosure region 78 and the shaft 69 is compressed and in the coupled state is present in the gap 79 in such a deformed state, in particular wherein at least a portion of the stabilization element 77 is plastically deformed, that only small residual elastic forces act on the beam steering unit 7 and the shaft 69 radially to the beam axis of rotation; and the beam steering unit 7 and the shaft 69 are stabilized in relation to each other in the axial direction with respect to the beam axis of rotation, the beam steering unit 7 is stabilized against a tilting relative to the shaft 69 over a stabilization region 15" defined by the length of the penetration region, and the residual elastic forces do not act on the mirrored surface 14 apart from a defined tolerance range, to the extent that the residual elastic forces on the mirrored surface 14 are so small that a high surface accuracy of the mirrored surface 14 is maintained.

The stabilization element 77 can be implemented, for example, in an annular shape and from a material with homogeneous plastic properties, for example, a homogeneous plastic flow range, wherein the stabilization element 77 is integrated into the beam steering unit 7, for example injection molded on the beam steering unit 7.

In addition, the beam steering unit 7 and the shaft 69 are typically glued 80 to each other as part of their coupling, wherein for excess adhesive or for applying the adhesive, defined openings 81 or access ports are provided in the beam steering unit 7.

Figure 17A:
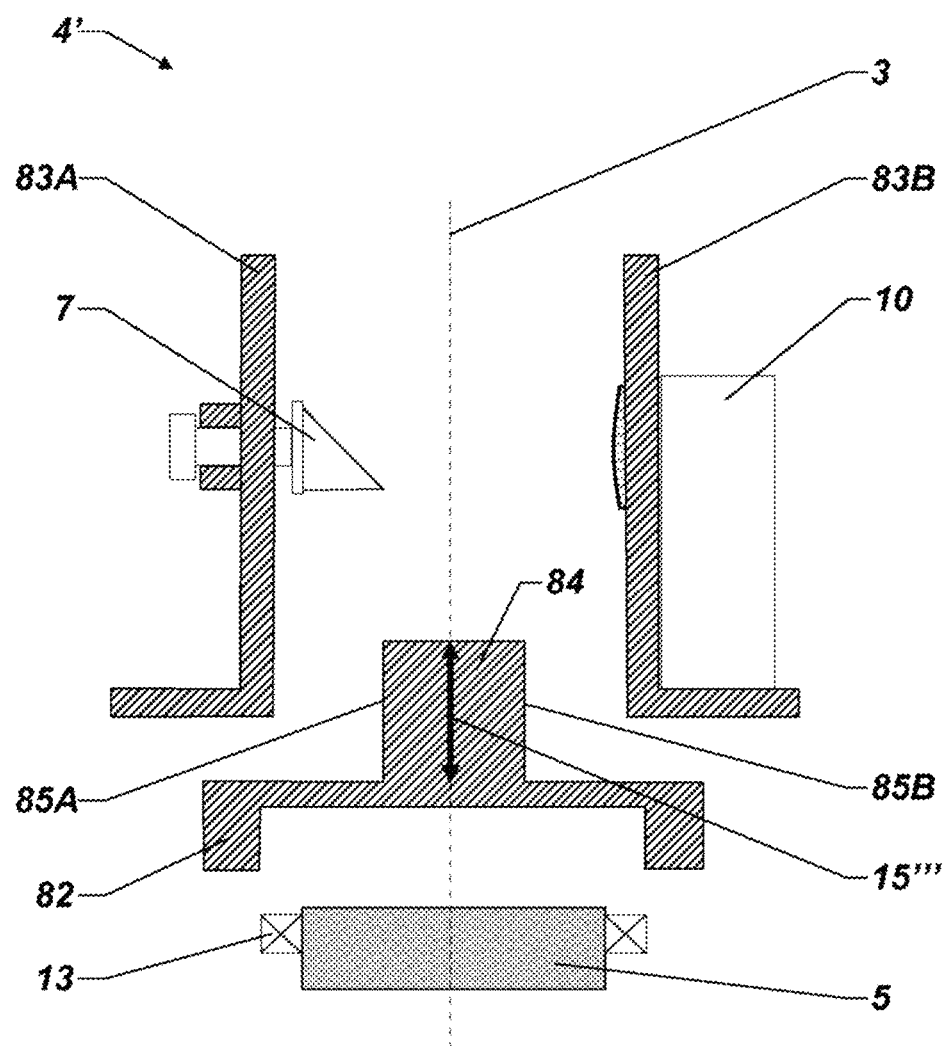
FIG. 17*a,b*: an arrangement according to the invention of a laser scanner by means of a skeletal, three-part support.
Figure 17B:
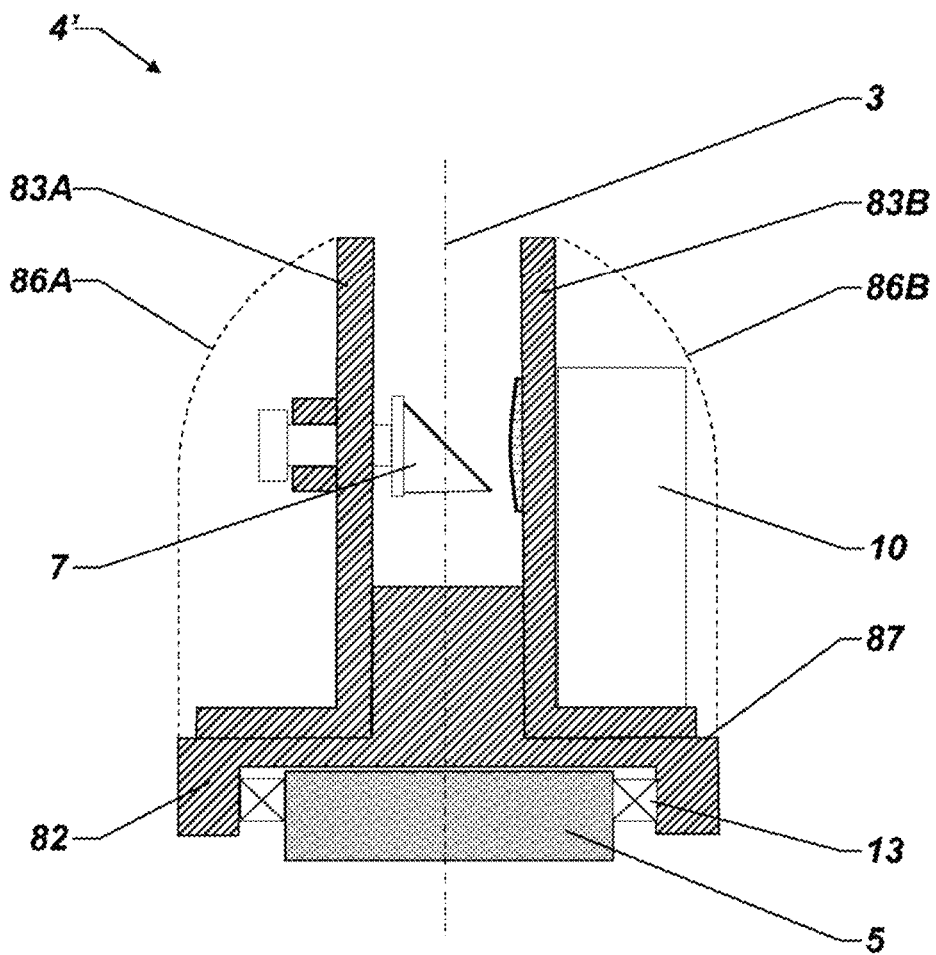

The FIGS. 17a,b show an arrangement according to the invention of a laser scanner using a skeletal, three-part support 4' and a base 5, wherein the support 4' here is formed by means of a skeletal structure consisting of three separately detachable support structures 82,83A,B, which are coupled to each other, for example, by means of a connection based on normal pins. FIG. 17a shows the individual elements of the support 4' and the base 5, whereas FIG. 17b shows the assembled elements.

A central support structure 82 is mounted on the base 5 coaxially with the support axis of rotation 3 and two further separate support structures 83A,B are connected to the central support structure 82, but not to the base 5, wherein the beam steering unit 7 is arranged exclusively in one of the other support structures 83A. In particular, the central support structure 82 defines a vertical axis 84 with an effective stabilization region 15''', by means of which a stabilization of the further support structures 83A,B is obtained against tilting of the support structures 83A,B relative to the vertical axis 84 and thus to the support axis of rotation 3. The vertical axis 84 further comprises two holders 85A,B for receiving and coupling the further, in particular, plate-like support structures 83A,B.

Such a design of the support 4' allows, for example, a modular deployment of the laser scanner, in particular with regard to servicing, in other words, maintenance or replacement of individual modular parts, or in terms of upgrade capabilities of the laser scanner. For example, the support structures can be designed in such a way that one support structure 83A receives the beam steering unit and another support structure 83B receives the distance measuring device 10, so that these two core elements of the laser scanner are each interchangeable in a modular fashion.

In order to ensure sufficient axial positional stability despite the skeletal structure, in particular in terms of tilting of the support structure 83A carrying the beam steering unit 7 with respect to the support axis of rotation 3, the support structures 82,83A,B, and in particular the two further support structures 83A,B, are each formed, for example, by means of an all-aluminum housing 86A,B (indicated by the dashed line in FIG. 17b), which additionally rests, for example, directly on a horizontal surface 87 of the central support structure 82.

Figure 18:
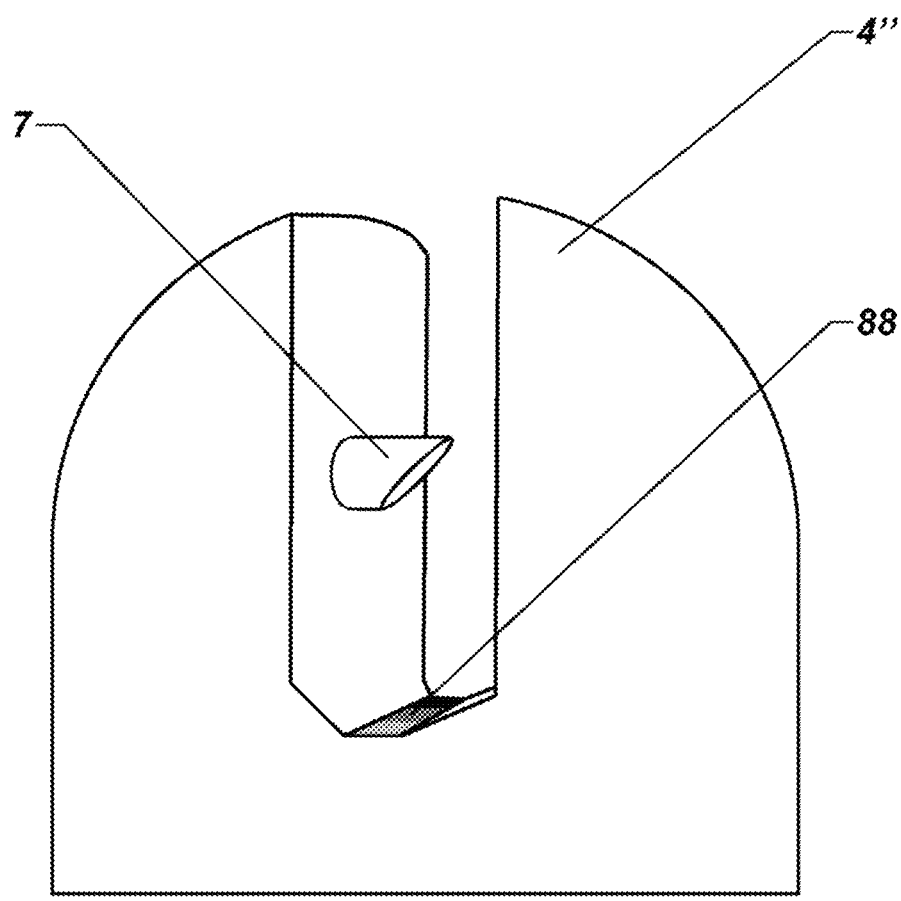
FIG. 18: a typical use of a reference element in the support of a laser scanner.

FIG. 18 shows a typical reference element 88 in the support 4" for the adjustment and/or calibration of the distance measuring device, for example, for an intensity, contrast and/or distance reference. Typically, the reflectivity and/or color of the reference element 88 can vary with the beam direction of rotation defined by the rotating beam steering unit 7, for example, to enable a dynamic distance and intensity calibration. In the example shown the reflectivity of the reference element 88 varies in three fixed levels.

Alternatively, a reference element unit with a reflectivity gradient and/or with a color gradient can also be used.

The distance measuring unit and the scanning can be based both on a single distance measurement beam and on a plurality of distance measurement beams emitted at the same time.

Figure 19A:
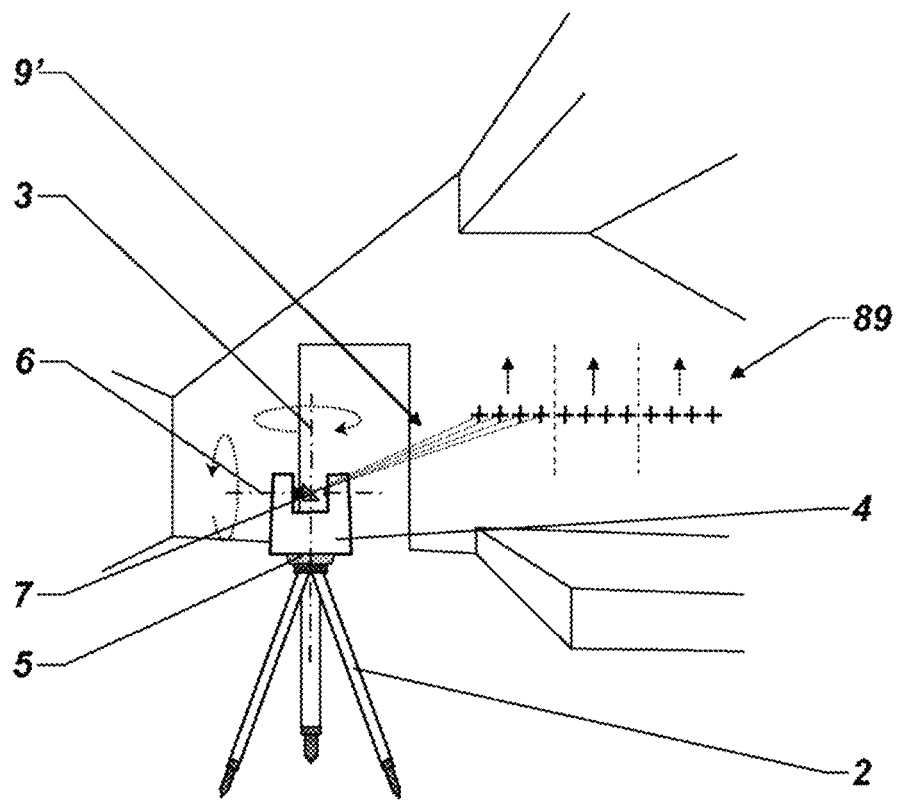
FIGS. 19*a* and 19*b*: a multi-beam arrangement according to the invention of a laser scanner.
Figure 19B:
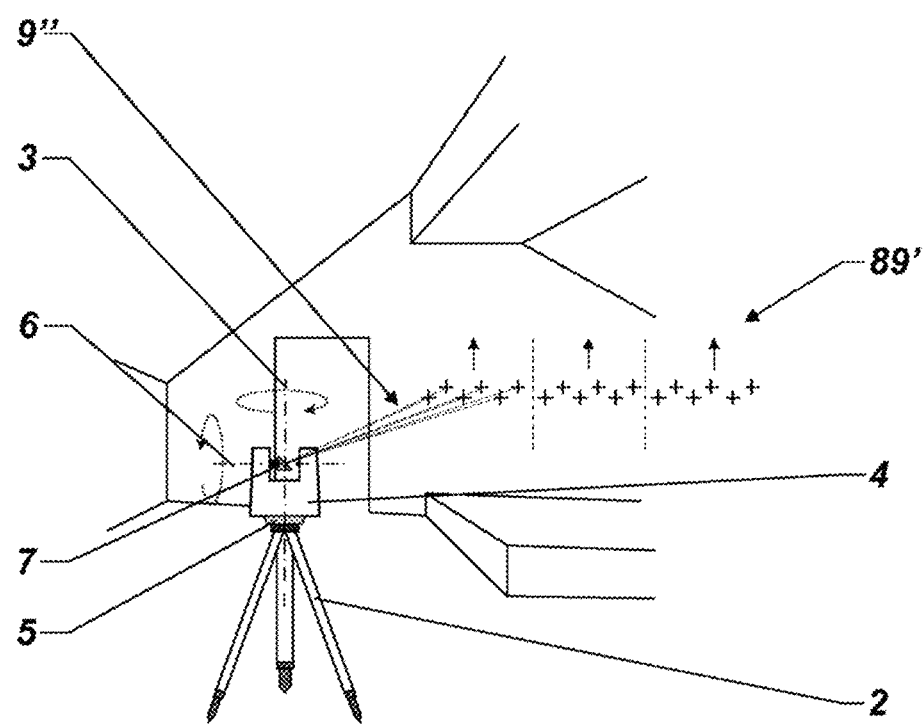

FIG. 19a and FIG. 19b show a laser scanner according to the invention, wherein the distance measuring unit and the scanning are based on a multi-beam scanning pattern 89,89', for example of a plurality of distance measurement beams emitted at the same time. This has the advantage, for example, that with a lower rotation speed of the beam steering unit about the fast axis a higher point rate and/or a higher point density is achieved. For example, instead of a single distance measurement beam a beam fan 9' can be used consisting, for example, of four adjacently arranged single beams, each with a small divergence.

For example, the individual beams are generated by an electronic distance measuring module arranged in the support 4 with a plurality of transmission beams and aimed at the beam steering unit 7, for example with a divergence of less than 15 degrees between the individual beams. For example, the beams are aligned in such a way that during the scanning process, in a scanning region near to the horizontal scanning plane (the plane perpendicular to the beam axis of rotation 3 and support axis of rotation 6), substantially similarly oriented scanning patterns 89,89' are generated in each case by the individual beams, for example, a scanning line, in particular, a smooth horizontal scanning line 89 (FIG. 19a) or a substantially—formed in FIG. 19b by six scanning points—horizontal scanning line 89' (FIG. 19b) with alternating vertically offset scanning points. Alternatively, the individual beams can be emitted in such a way that they form complex two-dimensional scanning patterns.

At least in a defined scanning region, for example near the horizontal plane, the beam fans 89,89' can be emitted in such a way that, during the rotation of the support 4 and the beam steering unit 7, for example complementary scanning lines or overlapping scanning lines are generated. The point density rises toward the zenith, where, for example, the individual scanning points, respectively scanning lines, increasingly overlap. The rotation of the scanning pattern (90 degrees of rotation with respect to alignment with the horizon) and over-determination of the 3D point cloud in the zenith can be allowed for by means of appropriate data reduction and/or data selection, for example. In addition, the rotation speeds of the support 4 about the support axis of rotation 3 and of the beam steering unit 7 about the beam axis of rotation 6 can be synchronized, for example to optimize the scanning with respect to scan traces.

Figure 20A:
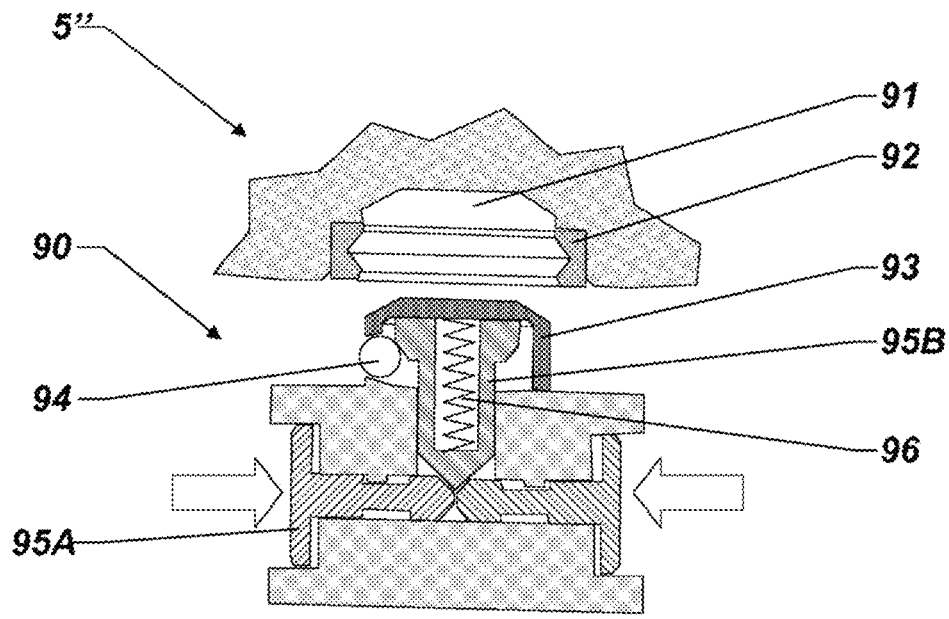
FIGS. 20*a* and 20*b*: a laser scanner with a receiving element (quick release) according to the invention, for example, for securing the laser scanner on a tripod.
Figure 20B:
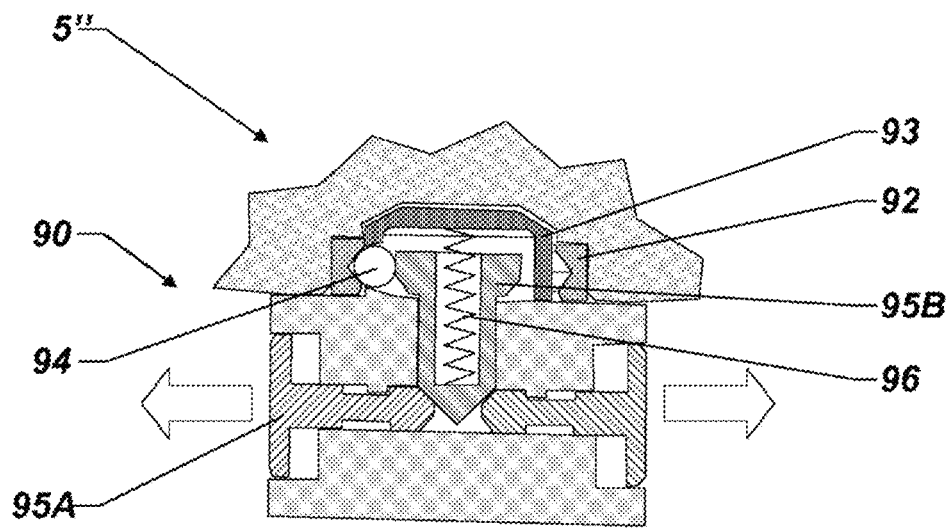

FIG. 20a,b shows a receiving element 90 for receiving the base 5" of a laser scanner, for example, for attaching the laser scanner to a tripod, wherein the receiving element 90 can be detached from the base 5" by means of a latching device. FIG. 20a shows the receiving element 90 in the state uncoupled to the base 5" and FIG. 20b shows the receiving element 90 in the state coupled to the base 5".

The latching device comprises a cutout portion 91 on the base 5", into which a ring 92 is recessed, which ring 92 in its interior has a circumferentially continuous cavity, and on the receiving element 90 comprises a spigot 93, wherein the spigot 93 comprises at least three latching bodies 94, which in a basic position of a release device comprising a radial pin 95A, an axial pin 95B and a spring 96 push radially outwards, for example by means of a tensioning spring, in order to block the detachability of the receiving element 90 from the base 5" by the fact that the latching bodies 94 engage in the cavity of the ring 92. In order to release the receiving element 90 from the base 5", activating the release device enables the latching bodes 94 to radially escape into the spigot 93.

It goes without saying that these figures illustrated only show possible exemplary embodiments in schematic form. The different approaches can also be combined with methods from the prior art.

The invention claimed is:

1. A laser scanner for optical measurement of an environment, comprising
    an optical distance measuring device for detecting distance measurement data, having:
        a transmitter for emitting a distance measurement radiation and
        a receiver for receiving returning parts of the distance measurement radiation,
    a flat sensor for detecting surface sensor data, in particular, at least one color camera for recording image data, wherein the sensor defines an optical axis of the sensor and a viewing direction of the sensor along the optical axis,
    a base,
    a support which is fixed to the base such that it can rotate about a support axis of rotation, in particular a slow axis of rotation,
    a beam steerer for the distance measurement radiation, which is fixed to the support such that it can rotate about a beam axis of rotation, in particular a fast axis of rotation,
    an angle encoder for recording angle data with respect to a rotation of the beam steerer about the beam axis of rotation,
wherein the distance measurement data, the surface sensor data and the angle data, hereafter designated as measurement data, are detected during a measurement process which comprises
    a scanning sampling by means of the distance measuring device with
        a defined progressive, in particular continuous rotation of the beam steerer about the fast axis of rotation, and
        a continuous emission of the distance measurement radiation and a continuous reception of returning parts of the distance measurement radiation, and
    performing multiple readouts of the surface sensor with respect to different viewing directions of the sensor,
    wherein:
        a central reference point of the laser scanner is defined as the origin for distance and angle measurement, given by the intersection point of the beam axis of rotation with the support axis of rotation,
        the surface sensor is fixedly arranged on the support with a stationary field of view relative to the support and facing away from the support, in the sense that the field of view of the sensor changes during the measurement process only in the event of a movement of the support, in particular a rotation of the support about the beam axis of rotation, and
        a virtual backwards extension of the optical axis of the surface sensor passes through the central reference point.

2. The laser scanner as claimed in claim 1, wherein a multiplicity of surface sensors is arranged on the support, wherein for each one of the multiplicity of surface sensors the virtual backwards extension of its optical axis substantially passes through the central reference point.

3. The laser scanner as claimed in claim 2, wherein
by means of a virtual 360-degree rotation of the beam steerer about the beam axis of rotation a scanning plane of the distance measurement radiation is defined, and
one of the multiplicity of surface sensors is arranged in such a way that its visual field cone intersects the scanning plane, in particular wherein the support is fixed on a base such that it can rotate about a support axis of rotation, in particular a slow axis of rotation, and the visual field cone of the surface sensor intersects with the steepest elevational orientation of the optical axis with a virtual extension of the support axis of rotation.

4. The laser scanner as claimed in claim 3, wherein
the support is fixed such that it can rotate around a support axis of rotation, in particular a slow axis of rotation,
the laser scanner comprises a further angle encoder for detecting further angle data as measurement data relating to a rotation of the support about the support axis of rotation,
the measurement also comprises multiple readouts of the multiplicity of surface sensors with respect to different azimuthal viewing directions of the individual sensors, and
the multiplicity of surface sensors is arranged in such a way that during the measurement process they enable a full-dome measurement, in particular wherein the visual field cone of the surface sensor intersects with the steepest elevational orientation of the optical axis with a virtual extension of the support axis of rotation, wherein the multiplicity of surface sensors define a minimum detection radius for the full-dome measurement in such a way that
by the central reference point and the minimum detection radius a spherical surface is defined with the central reference point at the center, and
during the measurement process at least one hemispherical surface defined by the spherical surface can only just be scanned by the multiplicity of surface sensors,
in particular, wherein by means of the multiplicity of surface sensors a partial surface of the sphere can be scanned that is larger than the hemispherical surface.

5. The laser scanner as claimed in claim 1, wherein
by means of a virtual 360-degree rotation of the beam steerer about the beam axis of rotation a scanning plane of the distance measurement radiation is defined, and
the surface sensor is arranged on the support and oriented in such a way that its azimuthal viewing direction and the azimuthal orientation of the scanning plane are different, such that a virtual backwards extension of the optical axis of the surface sensor cuts the scanning plane under a defined cutting angle, in particular wherein the cutting angle is at least 45 degrees, in particular wherein the scanning plane is not captured by the field of view of the surface sensor.

6. The laser scanner as claimed in claim 5, wherein the laser scanner is configured to carry out a fully automated first pre-programmed measurement process with defined steps according to the following temporal sequence:
recording of surface sensor data comprising
rotation of the support about the support axis of rotation, and
reading out the surface sensor for detecting surface sensor data,
in particular, wherein an initial processing and display of the surface sensor data is carried out,
recording of scanning measurement data, namely distance measurement data and associated first and second angle data, comprising,
rotation of the support about the support axis of rotation,
rotation of the beam steerer about the beam axis of rotation, and
emitting the distance measurement radiation and receiving returning parts of the distance measurement radiation for detecting distance measurement data, wherein associated first and second angle data are detected during the detection of distance measurement data.

7. The laser scanner as claimed in claim 6, wherein the laser scanner is configured to carry out an at least initial processing of parts of the measurement data during the measurement process, in particular linking of the scanning measurement data and the surface sensor data,
wherein the display of portions of the processed measurement data takes place continuously during the measurement process and is progressively, in particular continuously, updated based on the processed measurement data, in particular supplemented and/or replaced, specifically wherein a display coupled or integrated with the laser scanner is provided for the display.

8. The laser scanner as claimed in claim 6, wherein the laser scanner is configured such that during the measurement process a complete detection of all surface sensor data required for the measurement process first takes place before the detection of scanning measurement data,
wherein based on the detected surface sensor data a 2D panorama display of at least one partial region of the environment is generated, or a 2D full-dome projection is generated.

9. The laser scanner as claimed in claim 3, wherein the multiplicity of surface sensors is arranged with the same azimuthal direction,
wherein the optical axes of the multiplicity of surface sensors are arranged in a plane outside the scanning plane.

10. The laser scanner as claimed in claim 9, wherein the visual field cone of the surface sensor with the steepest elevation orientation of the optical axis intersects with the scanning plane at a distance of between 0.25 and 7m from the central reference point.

11. The laser scanner as claimed in claim 1, wherein
the laser scanner comprises a lamp which illuminates the field of view of the surface sensor, in particular, one or more LEDs, wherein the lamp defines an optical axis of the lamp and an illumination direction of the lamp along the optical axis of the lamp, and
the laser scanner is configured that the lamp is used for a selectively controllable illumination, substantially directed onto the field of view of the surface sensor.

12. The laser scanner as claimed in claim 11, wherein
the lamp is arranged on the support directly next to the surface sensor, in particular with a maximum lateral offset between the optical axis of the lamp and the optical axis of the surface sensor of 4 cm,
and/or
the lamp substantially emits white light, which means broadband light in the visible wavelength range, in particular by the lamp being designed as a dual LED, namely an LED couplet with two separate LEDs differing with respect to their emitted spectral range.

13. The laser scanner as claimed in claim 11, wherein the laser scanner is configured such that a first set of surface sensor data is detected, in particular surface sensor data with reduced resolution, based on the first set of surface sensor data a set of illumination settings for the lamp is derived, and based on the set of illumination settings, a second set of surface sensor data is recorded, in particular wherein the first set of surface sensor data is detected without using the lamp or using a uniform illumination by the lamp.

14. The laser scanner as claimed in claim 1, wherein the support is implemented by means of a skeletal structure, the support comprises a cover carried by the skeletal structure and detachable therefrom as a shell element, and the surface sensor is secured to the shell element and carried by the shell element, in particular wherein for the case that the laser scanner comprises a multiplicity of surface sensors, each thereof being mounted on the shell element individually and carried separately by the shell element, in the sense that each surface sensor of the plurality of surface sensors is carried separately and in each individual case by the shell element.

15. A measuring system for optical measurement of an environment, having a laser scanner according to claim 1, a processing unit for processing portions of the measurement data into processed measurement data, and a display unit for a defined display of portions of the processed measurement data, which represent at least a partial region of the environment, wherein an infrared sensor sensitive in the infrared wavelength range is integrally arranged on the support, wherein the infrared sensor defines an optical axis of the infrared sensor and a viewing direction of the infrared sensor along the optical axis, and a position of the infrared sensor and an orientation of its optical axis with respect to the beam steerer and the central reference point is known, and the laser scanner is configured such that the measurement data comprise infrared data detected with the infrared sensor and the measurement data can be associated with the infrared data, in particular so that the display of portions of the processed measurement data is generated in the form of a colored 3D point cloud and the temperature information are stored in the 3D point cloud and/or displayed with a defined color coding.

* * * * *